United States Patent
Goto et al.

(10) Patent No.: US 12,019,331 B2
(45) Date of Patent: Jun. 25, 2024

(54) LIQUID CRYSTAL DISPLAY DEVICE AND DISPLAY APPARATUS

(71) Applicant: SAMSUNG ELECTRONICS CO., LTD., Suwon-si (KR)

(72) Inventors: Yuichiro Goto, Kanagawa (JP); Naewon Jang, Suwon-si (KR); Youngchol Lee, Suwon-si (KR); Yoshihiro Yokote, Kanagawa (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/295,273

(22) Filed: Apr. 4, 2023

(65) Prior Publication Data
US 2023/0258978 A1 Aug. 17, 2023

Related U.S. Application Data

(63) Continuation of application No. PCT/KR2022/018600, filed on Nov. 23, 2022.

(30) Foreign Application Priority Data

Nov. 25, 2021 (JP) .................. 2021-190813

(51) Int. Cl.
G02F 1/1335 (2006.01)
(52) U.S. Cl.
CPC .. G02F 1/133607 (2021.01); G02F 1/133504 (2013.01)
(58) Field of Classification Search
CPC .................................................. G02F 1/133504
See application file for complete search history.

(56) References Cited

U.S. PATENT DOCUMENTS

| 9,377,650 B2 | 6/2016 | Oiwa et al. |
| 10,890,697 B2 | 1/2021 | Park et al. |
| 11,561,433 B2 | 1/2023 | Iwamoto et al. |
| (Continued) | | |

FOREIGN PATENT DOCUMENTS

| EP | 3620834 A1 | 3/2020 |
| JP | 836179 A | 2/1996 |
| (Continued) | | |

OTHER PUBLICATIONS

JP 08036179 A translation (Year: 1996).*
(Continued)

Primary Examiner — James A Dudek
(74) Attorney, Agent, or Firm — CANTOR COLBURN LLP

(57) ABSTRACT

A liquid crystal display device includes a light source, a light collection part, a liquid crystal part, and an anisotropic diffusion layer. The light source emits light. The light collection part collects the light emitted from the light source in the front direction of the liquid crystal display device so that, when an image is displayed, the light collecting property in a left-right direction is different from the light collecting property in an up-down direction. The liquid crystal part controls a transmission state of the light collected by the light collection part using a liquid crystal. The anisotropic diffusion layer anisotropically diffuses the light transmitted through the liquid crystal part.

18 Claims, 25 Drawing Sheets

(56) References Cited

U.S. PATENT DOCUMENTS

| | | |
|---|---|---|
| 2018/0149772 A1 | 5/2018 | Eo et al. |
| 2018/0372930 A1 | 12/2018 | Park et al. |
| 2023/0017197 A1 | 1/2023 | Goto et al. |

FOREIGN PATENT DOCUMENTS

| | | |
|---|---|---|
| JP | 2001311806 A | 11/2001 |
| JP | 4297696 B2 | 7/2009 |
| JP | 2010170076 A | 8/2010 |
| JP | 2015132785 A | 7/2015 |
| JP | 6315034 B2 | 4/2018 |
| JP | 6586805 B2 | 10/2019 |
| JP | 202016881 A | 1/2020 |
| JP | 202021038 A | 2/2020 |
| JP | 2020520048 A | 7/2020 |
| JP | 2022182093 A | 12/2022 |
| KR | 1020000077245 A | 12/2000 |
| KR | 102124022 B1 | 6/2020 |
| KR | 102413241 B1 | 6/2022 |
| WO | 2019156003 A1 | 8/2019 |
| WO | 2019244351 A1 | 12/2019 |
| WO | 2020024917 A1 | 2/2020 |

OTHER PUBLICATIONS

JP 2001033783 A (Year: 2001).*
International Search Report dated Feb. 28, 2023 for PCT/KR2022/018600, citing the above reference(s).

* cited by examiner

FIG. 7

| TYPE | (a) HARDENED LAYER | (b) ADHESIVE LAYER | (c) FILM | (d) VACANCY LAYER | (e) UNEVEN LAYER |
|---|---|---|---|---|---|
| STRUCTURE | LR(+HC)(17(18)) / ANISOTROPIC DIFFUSION LAYER(16) / SUBSTRATE(15) | LR(+HC)(17(18)) / SUBSTRATE LAYER(21) / ANISOTROPIC DIFFUSION LAYER(16) / SUBSTRATE(15) | LR(+HC)(17(18)) / ANISOTROPIC DIFFUSION LAYER(16) | LR(+HC)(17(18)) / ANISOTROPIC DIFFUSION LAYER(16) / SUBSTRATE(15) | LR(+HC)(17(18)) / ANISOTROPIC DIFFUSION LAYER(16) / SUBSTRATE LAYER(21) / SUBSTRATE(15) |
| MATRIX | CROSSLINKING RESIN | ADHESIVE RESIN | RESIN | RESIN | UNEVEN STRUCTURE OF HIGH REFRACTIVE RESIN |
| ANISOTROPIC SHAPE | INORGANIC PARTICLES (MgO, CaCO3) | INORGANIC PARTICLES (MgO, CaCO3) | RESIN (HIGH REFRACTION) | AIR (CAVITY) | |
| ANISOTROPIC DIFFUSION PROPERTY | SMALL ~ MEDIUM | SMALL ~ MEDIUM | SMALL ~ MEDIUM | MEDIUM | BIG |

FIG. 12

| | | TYPE | CONVENTIONAL | ANISOTROPIC DIFFUSION LAYER + LENS SHEET | | LENS SHEET CHANGE | | ANISOTROPIC DIFFUSION LAYER + LENS SHEET CHANGE |
|---|---|---|---|---|---|---|---|---|
| | | | | FRONT PRIORITY | VIEWING ANGLE PRIORITY | FRONT PRIORITY | VIEWING ANGLE PRIORITY | |
| STRUCTURE | | LENS SHEET | PRISM SHEET + PRISM SHEET | PRISM SHEET + PRISM SHEET | | PRISM SHEET + LENTICULAR SHEET A | PRISM SHEET + LENTICULAR SHEET B | PRISM SHEET + LENTICULAR SHEET A |
| | | ANISOTROPIC DIFFUSION LAYER | NONE | YES (LOW DIFFUSION) | YES (HIGH DIFFUSION) | NONE | NONE | YES (LOW DIFFUSION) |
| FRONT CHARACTERISTIC | | FRONT LUMINANCE | 100(Ref.) | 90 | 68 | 88 | 73 | 84 |
| | | FRONT CR | 100(Ref.) | 60 | 25 | 70 | 65 | 55 |
| VIEWING ANGLE CHARACTERISTIC | | 30° LUMINANCE | 50% | 55% | 65% | 70% | 74% | 74% |
| | | 60° LUMINANCE | 15% | 24% | 30% | 19% | 26% | 30% |
| | | FMHM | 56° | 68° | 78° | 80° | 86° | 86° |
| | | △u'v' (COLOR CHANGE) | 0.022 | 0.01 | 0.009 | 0.024 | 0.026 | 0.01 |

# LIQUID CRYSTAL DISPLAY DEVICE AND DISPLAY APPARATUS

CROSS-REFERENCE TO RELATED APPLICATION(S)

This application is a continuation application, under 35 U.S.C. § 111(a), of International Application No. PCT/KR2022/018600, filed on Nov. 23, 2022, which claims priority to Japanese Patent Application No. 2021-190813, filed on Nov. 25, 2021 in Japan Patent Office, the disclosure of which is incorporated by reference in its entirety.

BACKGROUND

1. Field

The disclosure relates to a liquid crystal display device and a display apparatus. More particularly, the disclosure relates to a liquid crystal display device being used in a display apparatus.

2. Description of the Related Art

In order to achieve high luminance, high contrast, and improvement of color reproducibility of a display apparatus using a liquid crystal display device, development of a backlight device is in progress. Also, it is attracting attention to provide a color conversion sheet containing fluorescent substance, etc., in the backlight device. This color conversion sheet utilizes primary light from a light source and color conversion light (secondary light) subjected to color conversion by the color conversion sheet. This realizes a backlight device with high luminous efficiency and excellent color reproducibility.

In such a backlight device, two prism sheets with high light collection properties, such as a prism sheet, are generally arranged. For this reason, the luminance and contrast when observing the display apparatus using a liquid crystal display device from the front are improved. The prism sheet condenses light diffused in horizontal and vertical directions of the display apparatus in a front direction, and improves the luminance and contrast when viewed from the front. In contrast, the emitted light other than the front direction is greatly reduced. As a result, a decrease in the luminance occurs when the display apparatus is viewed from a diagonal direction. In other words, viewing angle characteristic when the display apparatus is viewed in the diagonal direction may be significantly deteriorated. This tends to become particularly remarkable when a vertical alignment ("VA") type liquid crystal panel is used.

Recently, in order to improve the viewing angle characteristics, an anisotropic diffusion layer for diffusing light in a predetermined direction has been provided in a liquid crystal display device. The predetermined direction is a left-right direction of the display apparatus, for example. The anisotropic diffusion layer diffuses light in the left and right directions of the display apparatus using diffusion and diffraction phenomena of light. Thus, the luminance and contrast when observed from the diagonal direction of the display apparatus are improved.

Patent document 1 describes an edge light type backlight. The edge light type backlight includes at least one light source, an optical plate, and an optical member. The at least one light source emits primary light. The optical plate is disposed adjacent to the light source and performs light guiding. The optical member is disposed on a light-emitting surface side of the optical plate. The optical member includes a quantum dot sheet and a prism sheet disposed on the light-emitting surface side of the quantum dot sheet. The light source is disposed adjacent to a surface of the optical plate substantially orthogonal to the light-emitting surface of the optical plate. The quantum dot sheet has a quantum dot containing layer including quantum dots that absorb primary light and emit secondary light and a binder resin. In addition, the quantum dot sheet satisfies the following condition 1 when measuring. In the measurement, visible light using a halogen lamp (e.g., 12 volt (V), 48 watt (W)) as a light source is vertically irradiated to either surface of the quantum dot sheet. Then, the intensity of the transmitted light is measured at every degree in a range of −85 degrees to +85 degrees.

<Condition 1>

A sum of the intensity of −5 degrees to +5 degrees is denoted as P1, a sum of the intensity of −70 degrees to −85 degrees and +70 degrees to +85 degrees is denoted as P2, and a sum of the intensity of −15 degrees to −45 degrees and +15 degrees to +45 degrees is denoted as P3. At this time, (P1+P2)/P3 is 0.65 or less.

Patent document 2 describes an optical structure. The optical structure includes a low refractive index layer and a high refractive index layer. The interface between the low refractive index layer and the high refractive index layer forms an uneven shape. The concave portion of the uneven shape is concave toward the low refractive index layer, and the convex portion is convex toward the high refractive index layer. Each of the concave portion and the convex portion has a flat portion extending along the plan direction of the low refractive index layer and the high refractive index layer. The side of the uneven shape forms a shape in which two side surfaces adjacent to the flat portion of the concave portion are gradually thinner toward the low refractive index layer. The two side surfaces adjacent to the flat portion of the convex portion are gradually thinner towards the high refractive index layer. The high refractive index layer is disposed to face the display surface of the display apparatus.

Patent document 3 describes an anisotropic light diffusion adhesive laminator. The anisotropic light diffusion adhesive laminator is an adhesive laminated body having two or more adhesive layers including an adhesive. At least one layer of the adhesive layers includes needle-shaped fillers with a different refractive index from that of the adhesive. At the same time, the needle-shaped fillers roughly oriented in the same direction. The needle-shaped fillers include any one of boric acid aluminum, calcium silicate, and basic magnesium sulfate. The needle-shaped filler is a filler with a long axis length of 2 micrometers (μm) to 5000 μm and a short axis length of 0.1 μm to 20 μm.

[Patent document 1] Japanese Patent Registration No. 6586805

[Patent document 1] Japanese Patent Publication No. 2020-16881

[Patent document 1] Japanese Patent Registration No. 4297696

SUMMARY

In an embodiment of the disclosure, a liquid crystal display device may include a light source, a light collection part, a liquid crystal part, and an anisotropic diffusion layer. The light source emits light. The light collection part collects the light emitted from the light source in the front direction of the liquid crystal display device. In addition, the light collected by the light collection part differs in the light collecting properties in a left-right direction and in an up-down direction when an image is displayed. The liquid crystal part controls a transmission state of the light collected by the light collection part using a liquid crystal. The anisotropic diffusion layer anisotropically diffuses the light transmitted through the liquid crystal part.

In an embodiment, the light collection part may have a low light collecting property in a direction in which a viewing angle is to be further enlarged among the left-right direction and the up-down direction.

In an embodiment, the direction in which the viewing angle is to be further enlarged may be the left-right direction.

In an embodiment, the direction in which the viewing angle is to be further enlarged is generally the left-right direction when an image is displayed. Hereinafter, the direction in which the viewing angle is to be further enlarged is set to the left-right direction.

In an embodiment, the light collection part may include two lens sheets in which a plurality of lenses is arranged in a plane shape. The two lens sheets include a first lens sheet and a second lens sheet having a higher light collecting property than a light collecting property of the first lens sheet. By a difference in light collecting properties between the first lens sheet and the second lens sheet, the light collecting property in the direction in which the viewing angle is to be further enlarged among the left-right direction and the up-down direction is lowered.

In an embodiment, the first lens sheet and the second lens sheet may be selected from three types. The three types may include a prism sheet, a lenticular sheet, and a microlens array sheet.

In an embodiment, the direction with low light collecting property among the left-right direction and the up-down direction may be a direction along the direction in which the anisotropic diffusion layer anisotropically diffuses light.

In an embodiment, the liquid crystal display device may include at least one of a first adhesive layer and a second adhesive layer. The first adhesive layer is disposed on a light-emitting side with respect to the first lens sheet. The second adhesive layer is disposed on the light-emitting side with respect to the second lens sheet. When the first adhesive layer is provided, the light collecting property of the first lens sheet is controlled by the first adhesive layer. When the second adhesive layer is provided, the light collecting property of the second lens sheet is controlled by the second adhesive layer.

In an embodiment, the thickness of the first adhesive layer may be larger than the thickness of the second adhesive layer.

In an embodiment, the thickness of the first adhesive layer may be about 1.5 times or more of the thickness of the second adhesive layer.

In an embodiment, the first lens sheet and the second lens sheet may be the same type of lens sheet. When the first adhesive layer is provided, the light collecting property of the first lens sheet is controlled according to a thickness of the first adhesive layer. When the second adhesive layer is provided, the light collecting property of the second lens sheet is controlled according to a thickness of the second adhesive layer.

In an embodiment, both the first lens sheet and the second lens sheet may be prism sheets. The thickness of the first adhesive layer may be about 10 μm or more, and the thickness of the second adhesive layer may be less than about 10 μm.

In an embodiment, both the first lens sheet and the second lens sheet may be prism sheets. The vertex angle of the first lens sheet may be about 83° or more or more than about 97°. The vertex angle of the second lens sheet may be an angle of about 83° or more and about 97° or less.

In an embodiment, a full width half maximum of a luminance distribution, which is a relationship between luminance and an angle with respect to the front direction, may be considered. The full width half maximum may be an index indicating the light collecting property by the light collection part and greater by about 7° or more with respect to the direction in which the viewing angle is to be further enlarged among the left-right direction and the up-down direction.

In an embodiment, the anisotropic diffusion layer may include anisotropic particles and a resin part. The anisotropic particles have an anisotropic shape, and a long axis direction of each is arranged along one direction. The resin part disperses the anisotropic particles and includes a resin.

In an embodiment, the anisotropic diffusion layer may have a reflectance excluding the specular light component of about 1.0% or less.

In an embodiment, the anisotropic particles may have different refractive index in the long axis direction from the refractive index in the short axis direction.

In an embodiment, the refractive index is represented by $n_b$. The refractive index of the anisotropic particle in the long axis direction is represented by $n_{ax}$. The refractive index of the anisotropic particle in the short axis direction is represented by $n_{ay}$. At least one of the following relationships (I) and (II) is satisfied.

$$|n_b-n_{ax}|<0.04 \text{ and } 0.04<n_b-n_{ay}<0.50 \tag{I}$$

$$|n_b-n_{ay}|<0.04 \text{ and } 0.04<n_b-n_{ax}<0.50 \tag{II}$$

In an embodiment, the length in the long axis direction of the anisotropic particles may be about 1 μm or more and about 200 μm or less. The length in the short axis direction of the anisotropic particles may be about 0.1 μm or more and about 10 μm or less.

In an embodiment, the aspect ratio, which is the ratio of the length in the long axis direction to the length in the short axis direction of the anisotropic particle, may be set to 10 or more.

In an embodiment, the interface between the anisotropic particles and the resin part may be compatibilized with each other (compatibility).

In an embodiment, the refractive index of the resin part may be about 1.45 or more and about 1.65 or less.

In an embodiment, the anisotropic particles may include at least one of a metal oxide, a carbonate compound, a hydroxide compound, and a phosphate compound.

In an embodiment, the liquid crystal display device may further include a low refractive index layer which has a refractive index of about 1.40 or less. The difference between the refractive indices of the resin part and the low refractive index layer may be made about 0.1 or more.

In an embodiment, the anisotropic diffusion layer may have a haze value of about 20% or more and about 80% or less.

In an embodiment, the anisotropic diffusion layer may have an anisotropic diffusivity of 3 or more.

In an embodiment, the liquid crystal display device may further include a high refractive index layer having a refractive index of about 1.6 or more.

In an embodiment, the liquid crystal display device may further include a hard coating layer having a refractive index of about 1.54 or more.

In an embodiment, the liquid crystal display device may further include a low refractive index layer having a refractive index of about 1.40 or less and a substrate supporting the anisotropic diffusion layer. The substrate is provided between the low refractive index layer and the anisotropic diffusion layer.

In an embodiment, the liquid crystal display device may further include a low refractive index layer having a refractive index of about 1.40 or less. The anisotropic diffusion layer may function as a substrate supporting the low refractive index layer.

In an embodiment, the anisotropic diffusion layer may anisotropically diffuse light by air included in the vacancies formed in the anisotropic diffusion layer.

In an embodiment, the anisotropic diffusion layer may anisotropically diffuse light by the resin of the uneven structure formed in the anisotropic diffusion layer.

In an embodiment, the display apparatus in an embodiment of the disclosure may include the above-described liquid crystal display device.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which:

FIG. 7 is a view illustrating various structures of an anisotropic diffusion layer.

FIG. 12 is a table illustrating effects when an anisotropic diffusion layer or a lens sheet is provided.

DETAILED DESCRIPTION

However, in order to ensure sufficient viewing angle characteristics only with the anisotropic diffusion layer, it is desired to use an anisotropic diffusion layer with high diffusivity. In this case, the viewing angle characteristic is improved, but image quality characteristic in the front direction is deteriorated. The image quality characteristic in the front direction is contrast, for example. Moreover, when the front direction is set to zero (0) degree, the luminance when observed in a region of 20 degrees to 50 degrees, for example, is hard to improve.

A feature of the disclosure provides a liquid crystal display device and a display apparatus capable of improving viewing angle characteristics other than the front direction as well as the front direction.

According to the disclosure, a liquid crystal display device and a display apparatus capable of further improving viewing angle characteristics other than the front direction as well as the front direction may be provided.

Hereinafter, embodiments for implementing the disclosure will be described in detail. In addition, the disclosure is not limited to the following embodiments. Further, the disclosure may be implemented with various modification within the scope of the gist. In addition, the drawings are used for describing the embodiments, and do not show the actual size.

<Description of a Display Apparatus>

Figure 1A:
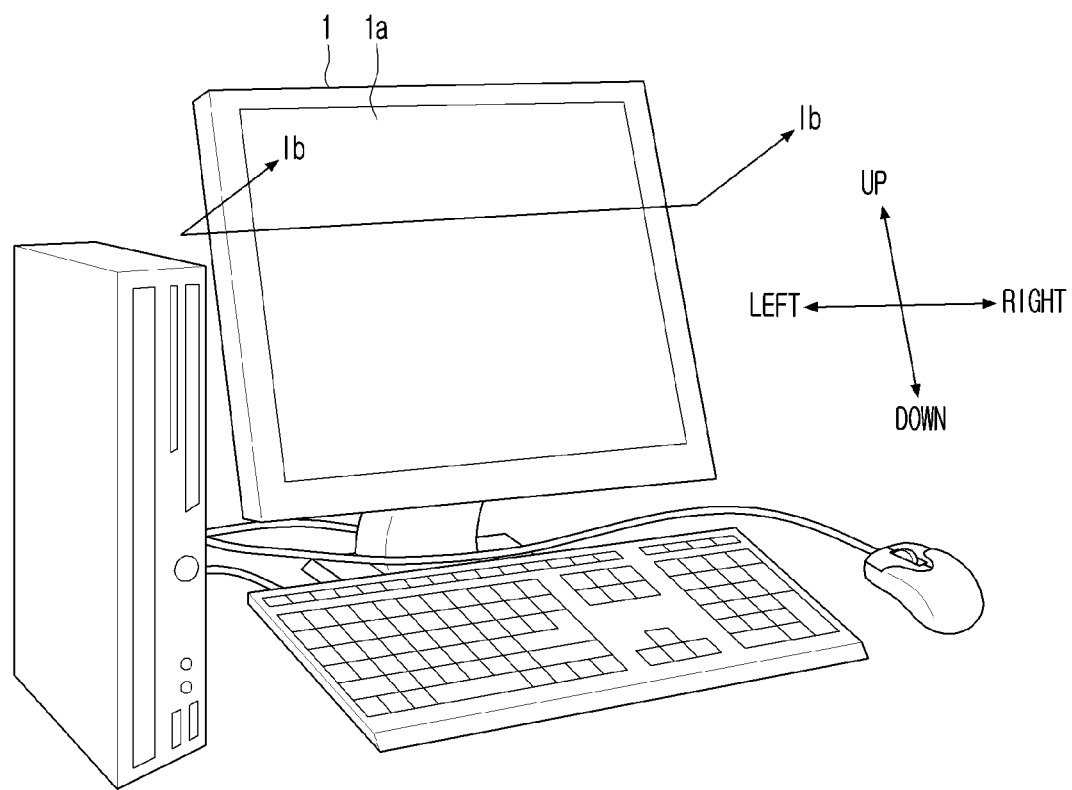
FIG. 1A is a view illustrating an embodiment of a display apparatus.

FIG. 1A is a view illustrating an embodiment of a display apparatus 1.

In an embodiment, the illustrated display apparatus 1 may be a liquid crystal display for a personal computer, a liquid crystal television ("TV"), or the like, for example. The display apparatus 1 displays an image on a liquid crystal display device 1a.

<Explanation of the Liquid Crystal Display Device 1a>

Figure 1B:
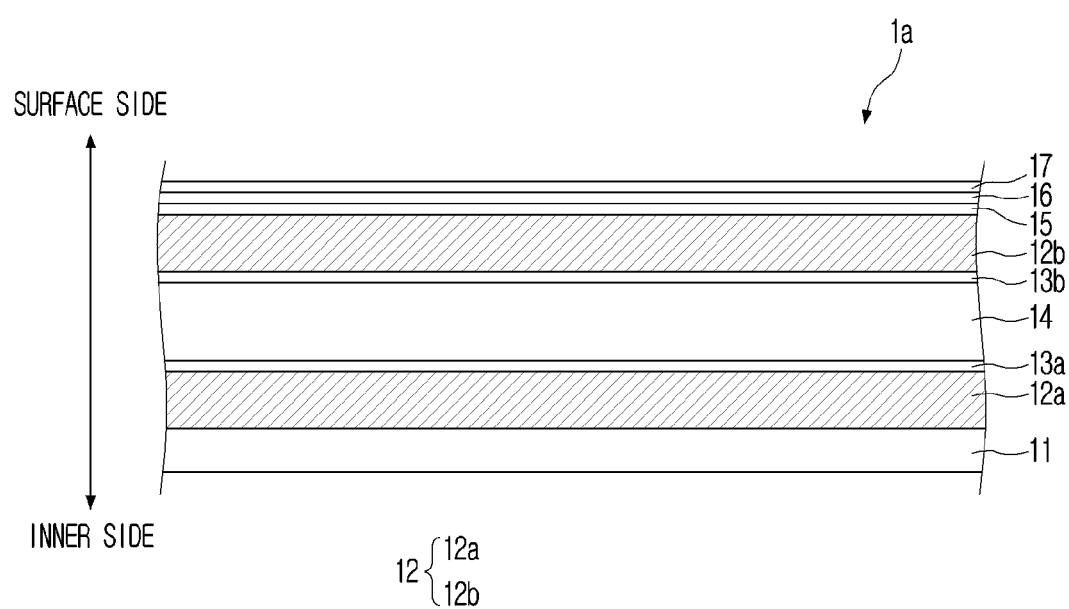
FIG. 1B is a cross-sectional view taken along line Ib-Ib of FIG. 1A and illustrates an embodiment of the configuration of a liquid crystal display device.

FIG. 1B is a cross-sectional view taken along line Ib-Ib of FIG. 1A and illustrates an embodiment of the structure of the liquid crystal display device 1a to which the illustrated embodiment is applied.

In an embodiment, the liquid crystal display device 1a performs image display. The liquid crystal display device 1a in the illustrated embodiment may be a liquid crystal display device using a vertical alignment ("VA") type liquid crystal panel, for example. The illustrated liquid crystal display device 1a includes a backlight device 11 and a polarizing film 12a. Moreover, the liquid crystal display device 1a includes a retardation film 13a, a liquid crystal part 14, a retardation film 13b, and a polarizing film 12b. In addition, the liquid crystal display device 1a includes a substrate 15, an anisotropic diffusion layer 16, and a low refractive index layer 17. These constitute a structure laminated from the inner side toward the surface side in this order. In addition, hereinafter, when not distinguishing the polarizing film 12a and the polarizing film 12b, they may be also simply referred to as the polarizing film 12. In this embodiment, the laminated body of the anisotropic diffusion layer 16 and the low refractive index layer 17 may be a resin film. Moreover, the laminated body of the substrate 15, the anisotropic diffusion layer 16, and the low refractive index layer 17 may be the resin film. In addition, in FIG. 1A, the directions used as an upward direction, a downward direction, a left direction, and a right direction in the description mentioned later are shown as up, down, left, and right, respectively. In addition, the part except the backlight device 11 in the liquid crystal display device 1a may be also referred to as a liquid crystal display panel (liquid crystal panel) hereafter. In other words, the part from the polarizing film 12a to the low refractive index layer 17 may be also referred to as the liquid crystal display panel. In this case, the liquid crystal display panel may be a VA type liquid crystal panel, for example.

The backlight device 11 includes a light source that emits light as a backlight, and irradiates light to the liquid crystal part 14. In an embodiment, the backlight device 11 may be a cold cathode fluorescent lamp or a white light-emitting diode ("LED"), for example.

In an embodiment, the polarizing film 12a and the polarizing film 12b may polarize light. The polarizing film 12a and the polarizing film 12b are formed so that polarization directions thereof are orthogonal to each other. The polarizing film 12a and the polarizing film 12b include a resin film in which iodine compound molecules are included in polyvinyl alcohol ("PVA"), for example. And it is sandwiched and attached between resin films including at least one of triacetylcellulose ("TAC"), polyethylene terephthalate ("PET"), and cyclo olefin polymer ("COP"). Light is polarized by inclusion of iodine compound molecules.

The retardation films 13a and 13b compensate for the viewing angle dependence of the liquid crystal display device 1a. The polarization form of the light passing through the liquid crystal part 14 is changed from linearly polarized light to elliptically polarized light. In an embodiment, in the case of black display, when the liquid crystal display device 1a is viewed from the vertical direction, the liquid crystal part 14 appears black, for example.

When the liquid crystal display device 1a is viewed from the diagonal direction, the retardation of the liquid crystal part 14 arises. Moreover, the axis of the polarizing film 12 is not about 90° (degrees). Therefore, a light leakage phenomenon arises, and the problem that contrast falls arises. In other words, the viewing angle dependence arises in the liquid crystal display device 1a. The retardation films 13a and 13b have a function of returning the elliptically polarized light to the linearly polarized light. For this reason, the retardation films 13a and 13b may compensate for the viewing angle dependence of the liquid crystal display device 1a.

A power source (not illustrated) is connected to the liquid crystal part 14. When a voltage is applied to the liquid crystal part 14 by the power source, the arrangement direction of the liquid crystals provided in the liquid crystal part 14 is changed. Accordingly, the liquid crystal part 14 controls the transmission state of light using the change of the arrangement direction of the liquid crystals.

In the case of a liquid crystal display device using a VA type liquid crystal panel, when no voltage is applied to the liquid crystal part 14 (voltage OFF), liquid crystal molecules are arranged in a vertical direction in the drawing. Then, when light is irradiated from the backlight device 11, first, the light passes through the polarizing film 12a to become polarized light. The polarized light passes through the liquid crystal part 14 as it is. Moreover, because the polarization direction is different, the polarizing film 12b blocks this polarized light. In this case, the user who watches the liquid crystal display device 1a may not visually recognize this light. In other words, in the state in which no voltage is applied to the liquid crystal part 14, the color of the liquid crystal becomes 'black'.

When the maximum voltage is applied to the liquid crystal part 14, the liquid crystal molecules are arranged in the horizontal direction in the drawing. Then, the direction of the polarized light passing through the polarizing film 12a is rotated 90 degrees by the action of the liquid crystal molecules. Therefore, the polarizing film 12b transmits the polarized light without blocking the polarized light. In this case, the user who watches the liquid crystal display device 1a may visually recognize this light. In other words, in the state where the maximum voltage is applied to the liquid crystal part 14, the color of the liquid crystal becomes 'white'. Moreover, the voltage may also be set between the voltage OFF and the maximum voltage. In this case, the liquid crystal molecules are in a state between the up-down direction in the drawing and the direction perpendicular to the up-down direction in the drawing. In other words, the liquid crystal molecules are arranged in a diagonal direction, which is a direction intersecting both of the up-down direction and the perpendicular direction. In this state, the color of the liquid crystal becomes 'gray'. Accordingly, by adjusting the voltage applied to the liquid crystal part 14 between OFF and the maximum voltage, it is possible to express grayscales other than black and white. And, by doing so, an image is displayed.

In addition, although not illustrated, a color image may also be displayed by a color filter.

Figure 2:
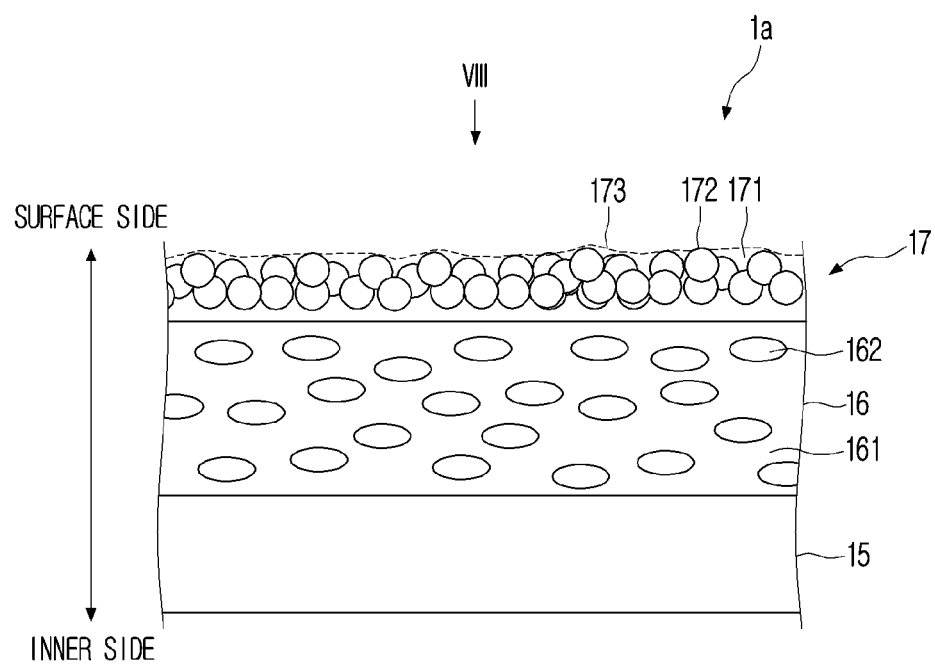
FIG. 2 is a view illustrating a substrate, an anisotropic diffusion layer, and a low refractive index layer.

FIG. 2 is a view illustrating a substrate 15, an anisotropic diffusion layer 16, and a low refractive index layer 17.

Here, in the drawing, the upper side is the surface side of the liquid crystal display device 1a, and the lower side is the inner side of the liquid crystal display device 1a.

The substrate 15 is a support for forming the anisotropic diffusion layer 16 and the low refractive index layer 17. The substrate 15 may be a transparent substrate having total light transmittance of about 85% or more. As the substrate 15, the above-described TAC is used, for example. In addition, the disclosure is not limited thereto, and PET or the like may be used. The substrate 15 has a thickness of about 20 micrometers ($\mu m$) or more and about 200 $\mu m$ or less, for example.

The anisotropic diffusion layer 16 anisotropically diffuses light. Here, 'anisotropic diffusion' is a property of having substantially strong light diffusivity in a predetermined direction. Also, 'the anisotropic diffusion layer' is a diffusion layer having substantially strong light diffusivity in a predetermined direction. When a member having the anisotropic diffusion layer is irradiated with isotropic light (circular) such as laser light, the transmitted light has a linear shape or an elliptical shape.

The low refractive index layer 17 reduces the reflectance of the liquid crystal display device 1a.

The anisotropic diffusion layer 16 and the low refractive index layer 17 will be described later in detail.

<Explanation of the Structure of the Backlight Device 11>

Next, the structure of the backlight device 11 will be described in more detail.

Figure 3:
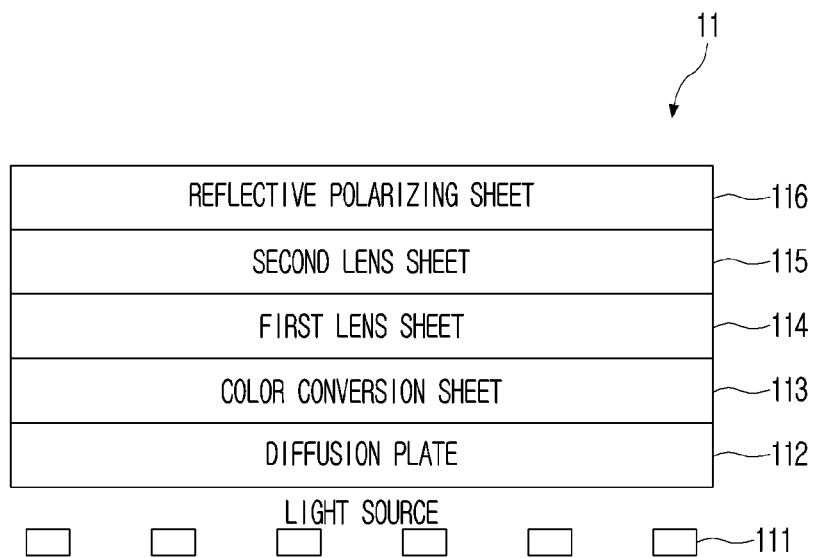
FIG. 3 is a view illustrating a structure of a backlight device.

FIG. 3 is a view illustrating a structure of the backlight device 11.

The illustrated backlight device 11 includes a light source 111, a diffusion plate 112, and a color conversion sheet 113. In addition, the backlight device 11 further includes a first lens sheet 114, a second lens sheet 115, and a reflective polarizing sheet 116. These are laminated in the thickness direction. In addition, as will be described later with reference to FIG. 4A, a first adhesive layer 117 is provided between the first lens sheet 114 and the second lens sheet 115. A second adhesive layer 118 is provided between the second lens sheet 115 and the reflective polarizing sheet 116. However, in FIG. 3, the above-described features are omitted and not illustrated. In addition, an adhesive layer may be provided also between other layers. However, in FIG. 3, the above-described feature is omitted and not illustrated.

The light source 111 is a so-called backlight, and emits light for allowing the user to visually recognize an image through the liquid crystal part 14. The light source 111 is a cold cathode fluorescent lamp, for example. Moreover, the light source 111 is an LED element, for example. The backlight device 11 may be of the direct type in which the light source 111 is arranged in a planer shape. Moreover, the backlight device 11 may be of the edge lit type in which the light source 111 is arranged at the edge portion of the backlight device 11 and surface light is emitted using a light guide plate. When the light source 111 is a cold cathode fluorescent lamp, light emitted from the cold cathode fluorescent lamp is usually white. When the light source 111 is an LED element, light emitted from LED element is usually white or blue.

The diffusion plate 112 diffuses and transmits the light emitted from the light source 111. For this reason, the luminance distribution of the light transmitted through the diffusion plate 112 is uniformed, and the luminance unevenness thereof is reduced. In an embodiment, the diffusion plate 112 may be a film including resin, for example. This resin is a polycarbonate resin, a polystyrene resin, an acrylic resin, and a polystyrene resin, for example. Light may be diffused by including fillers with a different refractive index in this resin. The fillers are micro particles which include an acrylic resin or polystyrene resin, for example. In another form, the diffusion plate 112 is formed by processing the surface shape of a sheet including resin. Light may be diffused by the processed surface shape.

The color conversion sheet 113 converts the light from the light source 111 into an arbitrary color. Accordingly, the color reproduction area of light may be widened. In an embodiment, when the color of the light source 111 is blue, the color conversion sheet 113 converts blue light into green light or red light, for example. As a result, the light emitted from the color conversion sheet 113 by mixing with the blue light of the light source 111 may be made white light. In an embodiment, the color conversion sheet 113 may be formed by coating a resin in which a wavelength conversion material is dispersed on a transparent film, for example. In an embodiment, the wavelength conversion material may be a phosphor or a quantum dot, for example. A practical embodiment of the wavelength conversion material may include an Yttrium Aluminum Garnet-based phosphor activated with cerium. Moreover, it may include a Lutetium Aluminum Garnet-based phosphor activated with cerium. In addition, it may include KSF-based phosphor. Moreover, it may include quantum dot phosphors, such as cadmium selenide, indium phosphide, or the like. In addition, in order to ensure long-term stability of the color conversion sheet 113, it may be laminated with a gas barrier film, when desired. When it is not desired to perform color conversion of the light from the light source 111, the color conversion sheet 113 is unnecessary.

In an embodiment, the first lens sheet 114 and the second lens sheet 115 may be a light collection part or a lens sheet. The first lens sheet 114 and the second lens sheet 115 collect the light emitted from the light source 111 in the front direction of the liquid crystal display device 1a. The 'front direction' is a direction in which the user is disposed when an image is displayed on the liquid crystal display device 1a. The 'front direction' may also be referred to as a normal line direction (vertical direction) with respect to the display surface of the liquid crystal display device 1a. 'Collecting light in the front direction' refers to reducing the angle of light emitted from the light source 111 when the front direction is set to the about 0° (zero degree) direction. In an embodiment, the light emitted from the light source 111 at an angle of about 50° with respect to the front direction is transmitted through the first lens sheet 114 or the second lens sheet 115, so that the angle of the light is made about 40°, for example. In this embodiment, the 'diagonal direction' means a direction other than the front direction. In other words, the 'diagonal direction' refers to a direction that becomes an angle other than about 0° when the front direction is about 0°.

The reflective polarizing sheet 116 transmits a first linearly polarized light component and reflects a second linearly polarized light component orthogonal to the first linearly polarized light component. In this case, the first linearly polarized light component is P polarized light, for example, and the second linearly polarized light component is S polarized light, for example. The reflected second linearly polarized light component is reflected by another optical member or the like and re-enters the reflective polarizing sheet 116 in a state in which the polarization is canceled. Then, in the reflective polarizing sheet 116, transmission or reflection is performed again. By repeating this process, only the first linearly polarized light component is transmitted through the reflective polarizing sheet 116. Then, the polarization direction of the first linearly polarized light component coincides with the transmission axis direction of the polarizing film 12a (refer to FIG. 1B). Accordingly, the amount of light that passes through the liquid crystal display device 1a may increase, and the luminance may be improved. As the reflective polarizing sheet 116, a brightness enhancement film DBEF manufactured by 3M Corporation may be used, for example. In addition, as the reflective polarizing sheet 116, a wire grid polarizer may be used.

<Description of the First Lens Sheet 114 and the Second Lens Sheet 115>

Next, the first lens sheet 114 and the second lens sheet 115 will be described in more detail.

Figure 4A:
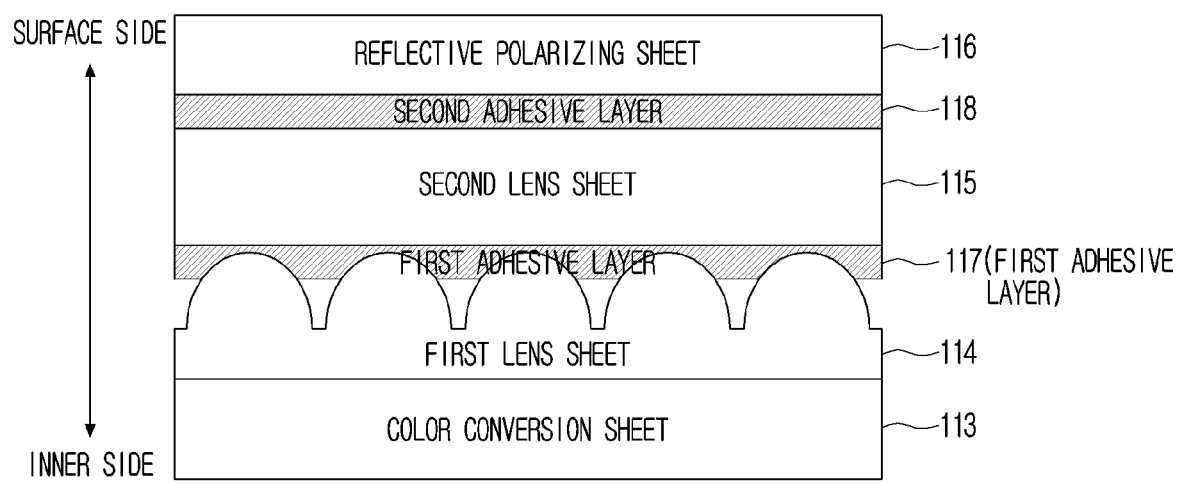
FIGS. 4A, 4B, and 4C are views illustrating structures of a first lens sheet and a second lens sheet.
Figure 4B:
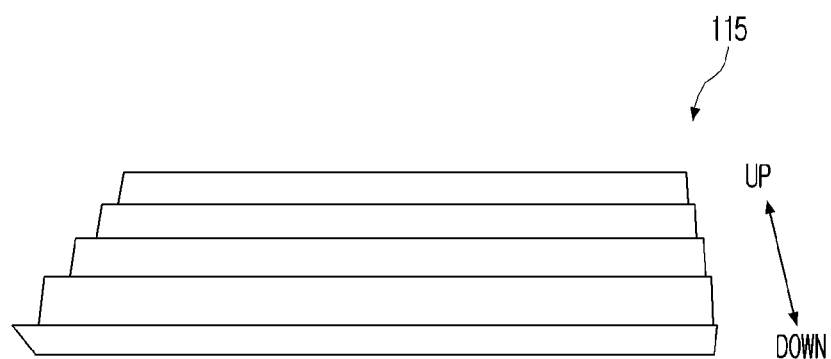
Figure 4C:
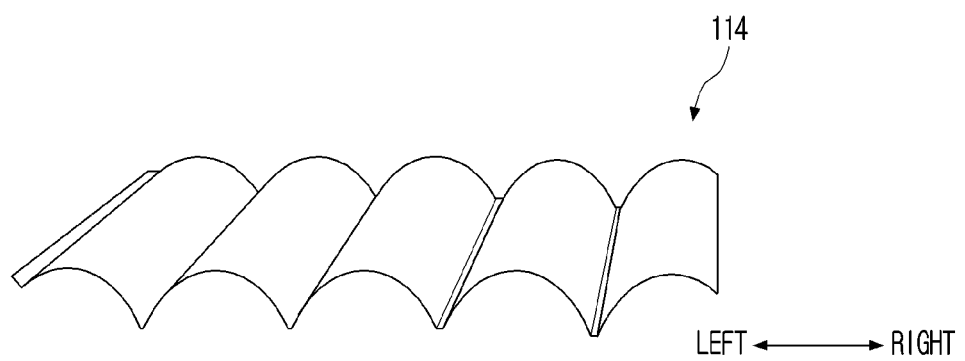

FIGS. 4A, 4B, and 4C are views illustrating structures of the first lens sheet 114 and the second lens sheet 115.

FIG. 4A is a view illustrating the first lens sheet 114 and the second lens sheet 115 viewed from the same direction as in FIG. 2. In other words, FIG. 4A is a cross-sectional view of the first lens sheet 114 and the second lens sheet 115, and is an enlarged view of FIG. 2.

As illustrated, a first adhesive layer 117 is provided between the first lens sheet 114 and the second lens sheet 115. The first adhesive layer 117 is disposed on the light-emitting side with respect to the first lens sheet 114. In other words, in FIG. 4A, the first adhesive layer 117 is disposed on the surface side of the first lens sheet 114. In this case, the first adhesive layer 117 bonds the first lens sheet 114 and the second lens sheet 115 to each other. In addition, a second adhesive layer 118 is provided between the second lens sheet 115 and the reflective polarizing sheet 116. The second adhesive layer 118 is disposed on the light-emitting side with respect to the second lens sheet 115. In other words, in FIG. 4A, the second adhesive layer 118 is disposed on the surface side of the second lens sheet 115. In this case, the second adhesive layer 118 bonds the second lens sheet 115 and the reflective polarizing sheet 116 to each other.

FIG. 4B is a perspective view illustrating the surface shape of the second lens sheet 115. FIG. 4C is a perspective view illustrating the surface shape of the first lens sheet 114. In FIGS. 4B and 4C, the upper direction in the drawing is a direction in which the light passing through the first lens sheet 114 or the second lens sheet 115 is emitted. In FIGS. 4B and 4C, when the liquid crystal display device 1a is actually used, the upward, downward, left, and right directions are respectively shown as up, down, left, and right.

As illustrated in FIGS. 4B and 4C, in the first lens sheet 114 and the second lens sheet 115, a plurality of lenses is arranged in a planar shape. The first lens sheet 114 and the second lens sheet 115 collect the light emitted from the light source 111 in the front direction as described above. At this time, when an image is displayed, the light collecting property in the left-right direction and the light collecting property in the up-down direction are different from each other. Specifically, when the image is displayed, the light collecting property in the up-down direction is higher is than the light collecting property in the left-right direction. This is realized by disposing the first lens sheet 114 and the second lens sheet 115 having a higher light collecting property than a light collecting property of the first lens sheet 114. In other words, because there is the difference in the light collecting properties of these lens sheets, the light collecting property in the direction in which the viewing angle is to be further enlarged among the left-right direction and the up-down direction is lowered. In this case, the light collecting property in the up-down direction is higher than the light collecting property in the left-right direction. Accordingly, the amount of light collecting in the front is adjusted by making the light collecting property of the second lens sheet 115 higher than that of the first lens sheet 114.

The left-right direction coincides with the direction that the user recognizes as the left-right direction when the user watches the liquid crystal display device 1a of the display apparatus 1. Moreover, the up-down direction coincides with the direction which the user recognizes as the up-down direction when the user watches the liquid crystal display device 1a of the display apparatus 1.

Figure 5A:
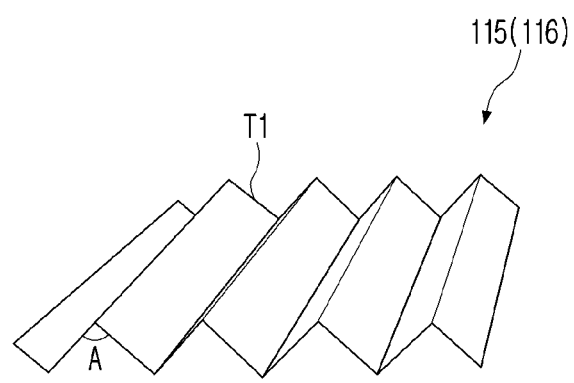
FIGS. 5A, 5B, and 5C are views illustrating types of lens sheets used as a first lens sheet and a second lens sheet.
Figure 5B:
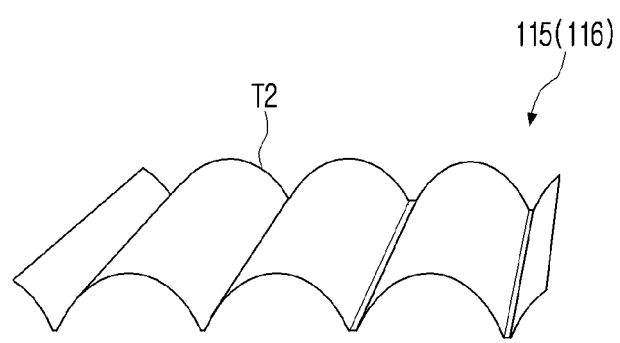
Figure 5C:
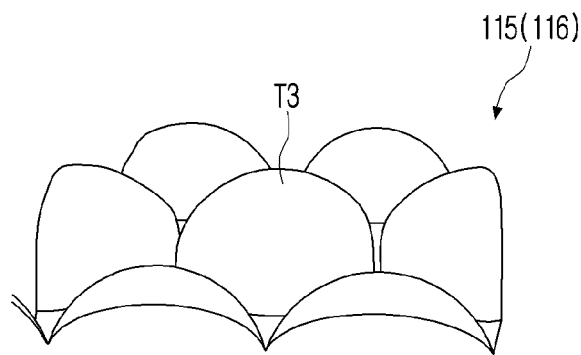

FIGS. 5A, 5B, and 5C are views illustrating types of lens sheets used as the first lens sheet 114 or the second lens sheet 115.

These lens sheets have different surface shapes. Due to the difference in the surface shape, the size of light collecting property, which is the degree of collecting light, is different.

FIG. 5A illustrates a prism sheet. The illustrated prism sheet has a triangular cross-section on the surface, and are provided with a plurality of protrusions T1 extending in one direction. The plurality of protrusions T1 is substantially parallel to each other and are arranged in a ridge shape. Moreover, the cross-sectional shape of the plurality of protrusions T1 may be a saw tooth shape. The prism sheet has the highest light collecting property when the triangular vertex angle A is about 90°. Accordingly, in the case of the prism sheet, as the vertex angle A becomes larger than about 90°, the light collecting property becomes lower. Moreover, as the vertex angle A becomes smaller than about 90°, the light collecting property becomes lower.

The period of the plurality of protrusions T1 is about 30 μm or more and about 500 μm or less, for example. In other words, the portions used as the vertex angle A of the triangular shape are arranged at intervals of about 30 μm or more and about 500 μm or less in a direction orthogonal to the one direction, for example. FIG. 5B illustrates a lenticular sheet. The illustrated lenticular sheet has a semicircular cross-sectional shape on the surface, and are provided with a plurality of protrusions T2 extending in one direction. In other words, one protrusion T2 has a half cylinder shape (kamaboko shape). The plurality of protrusions T2 is substantially parallel to each other and are arranged in a ridge shape.

FIG. 5C illustrates a microlens array sheet. The illustrated microlens array sheet is provided with a plurality of protrusions T3 having a semicircular cross-section and a circular shape when viewed from above on the surface. In other words, one protrusion T3 has a hemispherical shape. The plurality of protrusions T3 is arranged in a staggered shape when viewed from above.

The heights of the protrusions T1 to T3 may be substantially the same. In an embodiment, the height from the lowest portion to the highest portion may be about 60 μm, for example. However, the height of the protrusions is not limited thereto. The plurality of protrusions may have a plurality of heights. In an embodiment, the protrusions T1 to T3 having a height of about 60 μm and the protrusions T1 to T3 having a height of about 70 μm may be mixed, for example. However, in this case, it is preferable that the plurality of heights have periodicity. In an embodiment, a structure in which two protrusions T1 to T3 having a height of about 60 μm are continuously provided and then one protrusion T1 to T3 having a height of about 70 μm is provided is repeated, for example.

Among the lens sheets illustrated in FIGS. 5A to 5C, in general, the prism sheet has the highest light collecting property, and the microlens array sheet has the lowest light collecting property. The lenticular sheet has the light collecting property intermediate between the prism sheet and the microlens array sheet. In other words, in the order of high light collecting properties, the prism sheet, the lenticular sheet, and the microlens array sheet are in the order. In addition, the difference in the light collecting property depends on the refractive index of the resin forming the protrusions T1 to T3 on the surface of the lens sheet. The light collecting property also depends on the pitch and height of the patterns of the protrusions T1 to T3. Therefore, this order is a mere general order. By changing the material and shape of the protrusions T1 to T3, a different order may be obtained.

The first lens sheet 114 and the second lens sheet 115 may be selected from among the three types of lens sheets. However, it is not limited to what is selected from the three types of lens sheets, another type of lens sheet may be used. In addition, the second lens sheet 115 has a higher light collecting property than a light collecting property of the first lens sheet 114. In other words, the second lens sheet 115 collects more light in the front direction than the first lens sheet 114 does. As a result, the light collecting property of the liquid crystal display device 1a in the up-down direction becomes higher than the light collecting property in the left-right direction.

Accordingly, in this embodiment, as illustrated in FIG. 4C, for example, a lenticular sheet is selected as the first lens sheet 114. In addition, as illustrated in FIG. 4B, for example, a prism sheet is selected as the second lens sheet 115.

In addition, the direction in which the light collecting property is low among the left-right direction and the up-down direction may be a direction in which the anisotropic diffusion layer 16 anisotropically diffuses light. In other words, the direction in which the first lens sheet 114 having a lower light collecting property than a light collecting property of the second lens sheet 115 collects light is the left-right direction. The direction in which the anisotropic diffusion layer 16 anisotropically diffuses light may be also the left-right direction. In other words, the direction in which the light collecting property is lower matches the direction in which the anisotropic diffusion layer 16 diffuses the light.

According to the thickness of the first adhesive layer 117 or the second adhesive layer 118, the light collecting property of the lens sheet on the light source 111 side may be controlled. In other words, by adjusting the thickness of the first adhesive layer 117, the light collecting property of the first lens sheet 114 may be controlled. In addition, by adjusting the thickness of the second adhesive layer 118, the light collecting property of the second lens sheet 115 may be controlled.

In this case, as the thickness of the first adhesive layer 117 or the second adhesive layer 118 is reduced, the light collecting property of the lens sheet on the light source 111 side increases. As the thickness of these adhesive layers is enlarged, the light collecting property of the lens sheet on the light source 111 side becomes low. In the case of FIG. 4A, the lens sheet on the light source 111 side of the first adhesive layer 117 is the first lens sheet 114. The lens sheet on the light source 111 side of the second adhesive layer 118 is the second lens sheet 115. Increasing the thickness of these adhesive layers reduces the light collecting property caused by the surface shape of the lens sheet illustrated in FIGS. 5A to 5C. In an embodiment, when the thickness of the adhesive layer adhered to the prism sheet illustrated in FIG. 5A is increased, for example, it may be seen that the triangular surface shape has become a trapezoidal shape with a flat upper surface. In this case, the light collecting property decreases.

Therefore, in an embodiment, the same type of lens sheet may be used for the first lens sheet 114 and the second lens sheet 115. In an embodiment, the prism sheet is used for both the first lens sheet 114 and the second lens sheet 115, for example. According to the thickness of the first adhesive layer 117 and the second adhesive layer 118, the light collecting property in the left-right direction and the light collecting property in the up-down direction are controlled. When the first adhesive layer 117 is provided, the light collecting property of the first lens sheet 114 is controlled according to the thickness of the first adhesive layer 117. When the second adhesive layer 118 is provided, the light collecting property of the second lens sheet 115 is controlled according to the thickness of the second adhesive layer 118. Among the left-right direction and the up-down direction, the light collecting property of the direction in which the viewing angle is to be enlarged is lowered.

In this embodiment, the light collecting property in the up-down direction is higher than the light collecting property in the left-right direction. In this case, the thickness of the first adhesive layer 117 is made greater than the thickness of the second adhesive layer 118. Accordingly, the light collecting property in the up-down direction of the liquid crystal display device 1a becomes higher than the light collecting property in the left-right direction. When it is intended to improve the light collecting property, the thickness of these adhesive layers may be less than about 10 µm. Moreover, it is preferable that the thickness of these adhesive layers may be about 1 µm or more and about 9 µm or less. It is more preferable that the thickness of these adhesive layers may be about 3 µm or more and about 7 µm or less. By making the thickness of these adhesive layers into this range, it becomes possible to ensure high light collecting property while maintaining adhesive strength. Conversely, in the case of lowering the light collecting property, the thickness of these adhesive layers may be about 10 µm or more. Moreover, it is preferable that the thickness of these adhesive layers may be about 13 µm or more.

Therefore, in this embodiment, the thickness of the first adhesive layer 117 may be about 10 µm or more. Moreover, the thickness of the second adhesive layer 118 may be less than about 10 µm.

In an alternative embodiment, the first adhesive layer 117 may be provided and the second adhesive layer 118 may not be provided. In this case, the thickness of the second adhesive layer 118 may be about 0 µm. In other words, the light collecting property of the first lens sheet 114 is controlled according to the thickness of the first adhesive layer 117. The second adhesive layer 118 does not control the light collecting property of the second lens sheet 115. Also in this method, the light collecting property in the up-down direction may be made higher than the light collecting property in the left-right direction.

In the above example, the first lens sheet 114 is disposed on the light source 111 and below the second lens sheet 115. However, the disclosure is not limited thereto. In another embodiment, the second lens sheet 115 may be disposed on the light source 111 and below the first lens sheet 114. In other words, the stacking order of the first lens sheet 114 and the second lens sheet 115 may be reversed. In this case, the first adhesive layer 117 adheres the first lens sheet 114 and the reflective polarizing sheet 116 to each other. The second adhesive layer 118 adheres the first lens sheet 114 and the second lens sheet 115 to each other.

In addition, the light collecting property may be controlled according to the periodic interval of the lenses of the lens sheet, the aspect ratio of the pattern, the angle of the vertex angle A of the prism sheet, or the like. In an embodiment, the prism sheet may be used for both the first lens sheet 114 and the second lens sheet 115, for example. The vertex angle A of the prism sheet used as the first lens sheet 114 is set to be less than 83 degrees or more than 97 degrees. The vertex angle A of the prism sheet used as the second lens sheet 115 is set to 83 degrees or more and 97 degrees or less. However, the method of changing the thickness of the first adhesive layer 117 or the second adhesive layer 118 makes it easier to control the light collecting property.

The first adhesive layer 117 or the second adhesive layer 118 may be provided on the apex of the lens as illustrated in FIG. 4A. In addition, it is not desired to provide the first adhesive layer 117 or the second adhesive layer 118 to the bottom of the lens.

Moreover, the thickness of the first adhesive layer 117 may be greater than the thickness of the second adhesive layer 118. The thickness of the first adhesive layer 117 may be 1.5 times or more of the thickness of the second adhesive layer 118. Therefore, the light collecting property in the up-down direction becomes higher than the light collecting property in the left-right direction. In other words, the difference between the light collecting property in the up-down direction and the light collecting property in the left-right direction is further increased.

In addition, in the left-right direction and the up-down direction, the full width half maximum ("FWHM") of the luminance distribution, which is the relationship between the angle and the luminance with respect to the front direction, is considered. The FWHM is an index showing the light collecting property in the left-right direction or the up-down direction. In the liquid crystal display device 1a of this embodiment, the FWHM is larger in the left-right direction than in the up-down direction when the image is displayed. The difference of these FWHMs may be 7 degrees or more. Hereinafter, the difference between the luminance distributions in the left-right direction and the up-down direction may be also referred to as 'ΔFWHM'.

Figure 6:
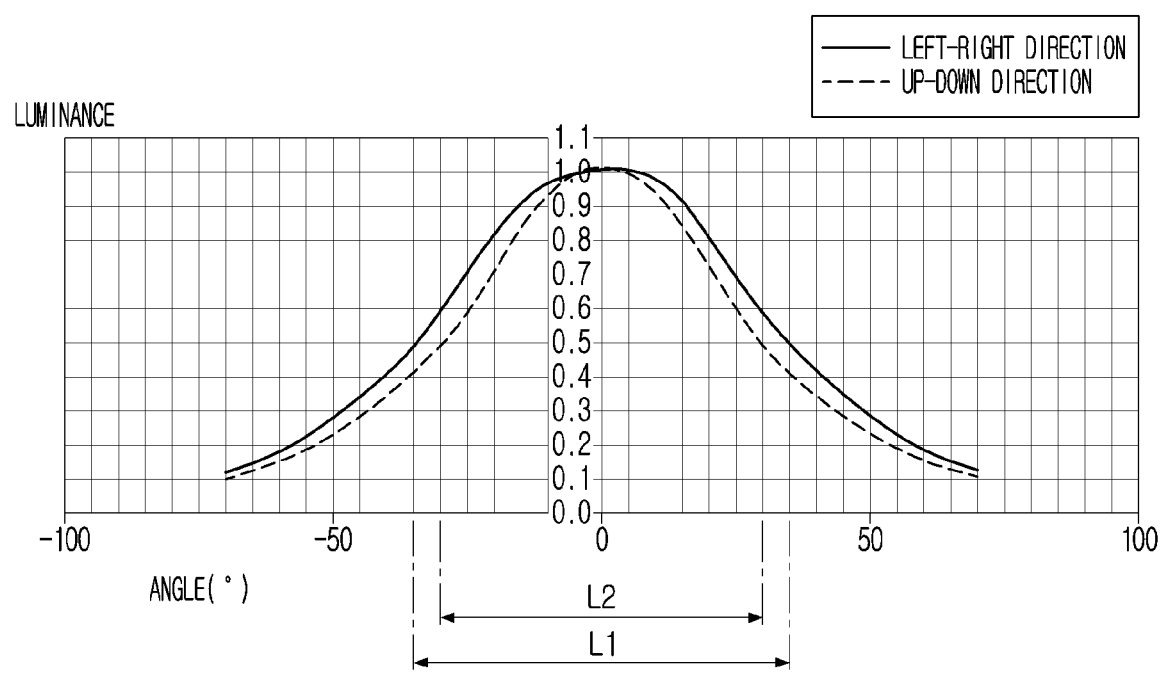
FIG. 6 is a view illustrating a luminance distribution that is a relationship between an angle and a luminance with respect to a front direction.

FIG. 6 is a view illustrating a luminance distribution that is a relationship between the luminance and the angle with respect to the front direction. Here, the horizontal axis represents the angle with respect to the front direction. In other words, the horizontal axis represents the angle when the front direction is set to 0 degree. The vertical axis represents the luminance. Here, the luminance distribution when the first lens sheet 114 and the second lens sheet 115 are provided is shown. In this case, the front luminance, which is the luminance in the front direction, is the largest.

The luminance distribution when the front luminance is normalized to 1.0 in the left-right direction and the up-down direction is shown. In addition, in the measurement of the luminance distribution, the structure which diffuses light in a predetermined direction, such as the anisotropic diffusion layer 16 described above, is not used.

The solid line represents the luminance distribution in the left-right direction. In other words, an embodiment of the luminance distribution of the light emitted from the backlight device 11 is shown. The dotted line represents the luminance distribution in the up-down direction.

In FIG. 6, the FWHM in the left-right direction shown by a solid line is indicated by L1. In addition, in FIG. 6, the FWHM of the up-down direction shown by the dotted line is indicated by L2.

The difference (ΔFWHM) between these FWHMs is the difference (L1−L2) between L1 and L2. In this case, the difference is about 10 degrees. In this embodiment, the difference may be 7 degrees or more.

<Description of the Anisotropic Diffusion Layer 16>

Next, the anisotropic diffusion layer 16 is described in more detail.

FIG. 7 is a view illustrating various structures of the anisotropic diffusion layer 16. In sections (a) to (e) of FIG. 7, the material constituting the anisotropic diffusion layer 16 is shown as 'Matrix'. In sections (a) to (e) of FIG. 7, the thing which anisotropically diffuses light and has an anisotropic shape is shown as 'anisotropic shape'. In sections (a) to (e) of FIG. 7, the degree of anisotropically diffusing light is shown as 'anisotropic diffusivity'.

Section (a) of FIG. 7 is a view illustrating an example in which the substrate 15, the anisotropic diffusion layer 16, a hard coating layer 18, and the low refractive index layer 17 are laminated in this order. Here, the hard coating layer 18 and the low refractive index layer 17 may be only the low refractive index layer 17. In other words, the hard coating layer 18 may not be provided. In FIG. 7, the hard coating layer 18 and the low refractive index layer 17 are shown as LR(+HC)(17(18)).

As the substrate 15, in order to eliminate coloring (rainbow stain) due to birefringence, a TAC film, an ultra-birefringent PET film, or the like is used.

When the hard coating layer 18 is provided, the strength of the resin film may be improved. The refractive index of the hard coating layer 18 may be about 1.54 or more. Therefore, the reflectance may be reduced compared with the case where only the low refractive index layer 17 is provided. Accordingly, more excellent anti-reflection property may be provided.

The substrate 15, the substrate layer 21, the anisotropic diffusion layer 16, and the low refractive index layer 17 (with the hard coating layer 18) are formed by coating, for example.

Section (b) of FIG. 7 is a view illustrating an example in which the substrate 15, the anisotropic diffusion layer 16, the substrate layer 21, and the low refractive index layer 17 (with the hard coating layer 18) are laminated in this order. The anisotropic diffusion layer 16 includes an adhesive resin and has adhesiveness. The anisotropic diffusion layer 16 also serves to attach the antireflection film including the substrate layer 21, the low refractive index layer 17, and the hard coating layer 18 and the substrate 15 which is a polarizing plate protective film to each other.

Section (c) of FIG. 7 is a view illustrating an example in which the anisotropic diffusion layer 16, the hard coating layer 18, and the low refractive index layer 17 are laminated in this order. The anisotropic diffusion layer 16 is a substrate provided with an anisotropic diffusion function. The hard coating layer 18 and the low refractive index layer 17 are coated on the substrate having an anisotropic diffusion function to form a surface protection substrate having an antireflection function.

The anisotropic diffusion layer 16 of sections (a) to (c) of FIG. 7 will be described in detail later. However, the anisotropic diffusion layer 16 includes a resin part 161 and anisotropic particles 162.

Section (d) of FIG. 7 is a view illustrating an example in which the substrate 15, the anisotropic diffusion layer 16, and the low refractive index layer 17 (with the hard coating layer 18) are laminated in this order. The anisotropic diffusion layer 16 includes a core layer 163 including vacancies 163a and a skin layer 164 for protecting the core layer 163. The vacancies 163a in the core layer 163 are crazing in a substantially linear shape, and are formed by crazing process or the like. Incident light is anisotropically diffused at the interface between the resin and the vacancies forming the core layer 163, thereby contributing to the expansion of the viewing angle. Illustrative embodiments include embodiments 1 to 5 of International Patent Publication No. 2019/156003.

Section (e) of FIG. 7 is a view illustrating an example in which the substrate 15, the substrate layer 21, the anisotropic diffusion layer 16, and the low refractive index layer 17 (with the hard coating layer 18) are laminated in this order. The anisotropic diffusion layer 16 includes an interface 165 in a concave-convex shape within the layer. The interface 165 includes resins having different refractive indices. Therefore, incident light is anisotropically diffused by refracting and diffracting at the interface, thereby contributing to an expansion of the viewing angle. An illustrative example includes an embodiment described in Japanese Patent Publication No. 2020-16881.

In this embodiment, it is preferable that anisotropic diffusivity is low. In the embodiments of FIG. 7, the anisotropic diffusivity may be substantially small to medium. When formed in this way, it is more suitable to combine with the combination of the first lens sheet 114 and the second lens sheet 115 described above. As the anisotropic diffusion layer 16, among those shown in sections (a) to (e) of FIG. 7, the structures of sections (a) to (c) of FIG. 7 are preferable. In other words, the structure in which the anisotropic diffusion layer 16 includes the resin part 161 and the anisotropic particles 162 is preferable. Hereinafter, the anisotropic diffusion layer 16 having this structure will be described in detail.

Figure 8A:
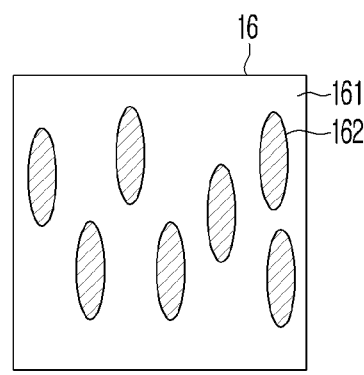
FIGS. 8A to 8C are views for explaining an anisotropic diffusion layer.
Figure 8B:
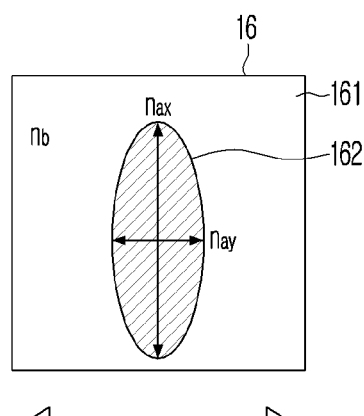
Figure 8C:
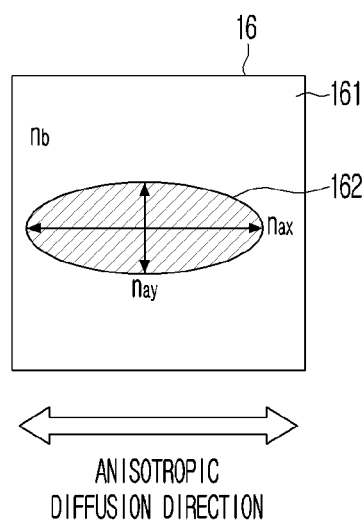

FIGS. 8A to 8C are views for explaining the anisotropic diffusion layer 16.

FIG. 8A is a view illustrating the anisotropic diffusion layer 16 viewed from the direction VIII in FIG. 2.

As illustrated in FIGS. 2 and 8A, the anisotropic diffusion layer 16 includes at least the resin part 161 and anisotropic particles 162.

The resin part 161 disperses the anisotropic particles 162 and includes a resin. Accordingly, the resin part 161 may be also referred to as a dispersion layer that fixes the anisotropic particles 162 so that the long axis direction thereof is arranged in one direction.

The anisotropic particles 162 have an anisotropic shape, and the long axis direction of each of the anisotropic particles 162 is arranged along one direction in the resin part 161. In this case, as illustrated in FIG. 2, the long axis direction of each of the anisotropic particles 162 is arranged along the in-plane direction of the anisotropic diffusion layer 16. In an alternative embodiment, as illustrated in FIG. 8A, the long axis direction of each of the anisotropic particles 162 is arranged along the up-down direction in the drawing.

The resin part 161 includes a resin as described above. The refractive index of the resin part 161 may be about 1.45 or more and about 1.65 or less. The specular component exclusion ("SCE"), which is the reflectance excluding the specular component of the anisotropic diffusion layer 16, may be about 1.0% or less. By setting the refractive index of the resin part 161 within this range, the SCE tends to be about 1.0% or less. When the refractive index of the resin part 161 is out of this range, the SCE will easily exceed about 1.0%.

In addition, the difference between the refractive indices of the resin part 161 and the low refractive index layer 17 may be about 0.1 or more. By making the difference between the refractive indices of the resin part 161 and the low refractive index layer 17 larger, the reflectance may be further reduced.

As the resin forming the resin part 161, a (meta) acrylic resin, a polyethylene resin, and a polypropylene resin may be used, for example. Moreover, e.g., a polystyrene resin, a polyurethane resin, a polycarbonate resin, a polyester resin, and a silicone resin may be used, for example. Moreover, a resin having adhesiveness, such as an acrylic adhesive resin, may be used.

The anisotropic particles 162 have an anisotropic shape, and the refractive index in the long axis direction is different from the refractive index in the short axis direction. Accordingly, anisotropic diffusivity is expressed in the anisotropic diffusion layer 16. In addition, the refractive index of the anisotropic particles 162 is different from the refractive index of the resin part 161. The shape of the anisotropic particles 162 is not specifically limited as long as it is an anisotropic shape. In an embodiment, the anisotropic shape may be a spindle shape, a needle shape, a fiber shape, a cylindrical shape, a disk shape, or the like, for example.

FIGS. 8B and 8C are views illustrating the refractive index of the anisotropic particle 162. Here, the refractive index in the long axis direction of the anisotropic particles 162 is $n_{ax}$, the refractive index in the short axis direction is $n_{ay}$, and the refractive index of the resin part 161 is $n_b$. When the anisotropic diffusion direction is the lateral direction in the drawing, in the case of FIG. 8B, the difference between the refractive index $n_{ax}$ and the refractive index $n_b$ may be smaller. In the case of FIG. 8C, the difference between the refractive index $n_{ay}$ and the refractive index $n_b$ may be smaller. That is, it is preferable that the difference between the refractive indices $n_{ax}$ and $n_{ay}$ of the anisotropic particles 162 in the direction perpendicular to the anisotropic diffusion direction and the refractive index $n_b$ of the resin part 161 is smaller.

Further, at least one of the following relationship (I) and (II) may be satisfied. By setting the refractive indices of the anisotropic particles 162 and the resin part 161 within the following ranges, backscattering in a direction perpendicular to the anisotropic diffusion direction is suppressed. The SCE of the anisotropic diffusion layer 16 may be made low.

$$|n_b - n_{ax}| < 0.04 \text{ and } 0.04 < n_b - n_{ay} < 0.50 \quad (I)$$

$$|n_b - n_{ay}| < 0.04 \text{ and } 0.04 < n_b - n_{ax} < 0.50 \quad (II)$$

Moreover, in order to set the SCE of the anisotropic diffusion layer 16 to about 1.0% or less, the length and the aspect ratio of the anisotropic diffusion layer 16 may be in the following ranges. Outside the ranges, it is easy for the SCE to exceed about 1.0%.

That is, the anisotropic particle 162 may have a length in the long axis direction of about 0.5 µm or more and about 500 µm or less. Moreover, the anisotropic particle 162 preferably has a length in the long axis direction of about 1 µm or more and about 200 µm or less.

Also, the anisotropic particle 162 may have a length in the short axis direction of about 0.05 µm or more and about 30 µm or less. Moreover, the anisotropic particle 162 preferably has a length in the short axis direction of about 0.1 µm or more and about 10 µm or less.

By making the anisotropic particles 162 into such a size, backscattering at the interface between the anisotropic particles 162 and the resin part 161 is suppressed and the SCE of the anisotropic diffusion layer 16 is easily reduced, while ensuring favorable anisotropic diffusivity.

In addition, the aspect ratio, which is the ratio of the length in the long axis direction to the length in the short axis direction of the anisotropic particle 162, may be 10 or more. Moreover, it is preferable that the aspect ratio is 20 or more. By setting the aspect ratio of the anisotropic particle 162 to this range, it becomes easy to ensure the anisotropic diffusivity which may improve the viewing angle characteristic of the display.

In addition, from the same viewpoint, the anisotropic particles 162 and the resin part 161 may be compatibilized with each other. Thus, the refractive index at the interface between the anisotropic particles 162 and the resin part 161 changes continuously, and the backscattering may be reduced. Also, it becomes easier to make the SCE further smaller. In this case, the boundary between the anisotropic particles 162 and the resin part 161 is ambiguous because they are mixed with each other. However, in this case, it is clear that the anisotropic particles 162 exist as particles in the resin part 161. A method of blending a compatibilizing agent may be exemplified as a method of compatibilizing the interface. Moreover, although described later in detail, there may be a method of mixing the solvent which dissolves the component of the anisotropic particles 162 when applying the coating solution forming the anisotropic diffusion layer 16. That the interfaces are compatibilized with each other may be confirmed by observing the cross-section of the anisotropic diffusion layer 16 with a scanning electron microscopy ("SEM").

The anisotropic particles 162 includes at least one of a metal oxide, a carbonate compound, a hydroxide compound, and a phosphate compound, for example. In an embodiment, the metal oxide may be silica, titanium oxide, aluminum oxide, zinc oxide, or the like, for example. In addition, the anisotropic particles 162 is a compound, such as calcium carbonate, silicon carbide, nitrogen carbide, basic magnesium sulfate, or the like, for example. Moreover, the anisotropic particles 162 is glass fiber, (meta) acrylic resin, a polystyrene resin, a melamine resin, etc., for example. In addition, the anisotropic particles 162 may be formed by mixing the isotropic particles and performing extrusion melting or stretching.

The anisotropic diffusion layer 16 may have a haze value of about 20% or more and about 80% or less. Moreover, it is preferable that the anisotropic diffusion layer 16 has a haze value of about 30% or more and about 65% or less. Then, when the anisotropic diffusion layer 16 is disposed (e.g., mounted) on a display, sharp image quality with little glare may be secured.

The anisotropic diffusion property of the anisotropic diffusion layer 16 may be measured with a variable angle photometer (Gonio photometer). Transmitted light when the light beam is irradiated to the anisotropic diffusion layer 16 at an incident angle of about 0° (vertical direction) is acquired while changing the light reception angle. Using this, the intensity distribution state of the transmitted and scattered light is measured. By acquiring this in the anisotropic diffusion direction and in the direction perpendicular to the anisotropic diffusion direction, the anisotropic diffusion property may be quantitatively evaluated. In this embodiment, the anisotropic diffusion property is evaluated by anisotropic diffusivity (ADV). The anisotropic diffusivity may be calculated by the following formula. The anisotropic diffusion layer 16 may have the anisotropic diffusivity (ADV) of about 3 or more. Moreover, it is preferable that ADV is about 15 or more, and it is more preferable that ADV is about 25 or more.

> ADV=(Amount of light transmitted at 5° in the anisotropic diffusion direction measured with a variable angle photometer)/(Amount of light transmitted at 5° in the direction perpendicular to the anisotropic diffusion direction measured with a variable angle photometer)

<Description of the Low Refractive Index Layer 17>

Next, the low refractive index layer 17 will be described in more detail.

The low refractive index layer 17 is a functional layer for reducing the reflectance of the liquid crystal display device 1a.

The low refractive index layer 17 has a substantially small refractive index. In detail, the low refractive index layer 17 may have a refractive index of about 1.40 or less. Moreover, it is preferable that the refractive index is about 1.20 or more and about 1.35 or less. Then, the liquid crystal display device 1a with a substantially small reflectance may be implemented. The low refractive index layer 17 may be formed with a single layer or a multilayer. The low refractive index layer 17 may be formed with as few layers as possible from the viewpoint of manufacturing cost. The low refractive index layer 17 may have a thickness of 50 nanometers (nm) or more and 500 nm or less.

The low refractive index layer 17 includes a binder 171 and hollow silica particles 172 distributed in the binder 171. In addition, the low refractive index layer 17 further includes a surface modifier 173 mainly distributed on the surface side of the binder 171.

The binder 171 has a network structure and connects the hollow silica particles 172 to each other. The binder 171 includes a resin as a main component. As the resin, a fluorinated resin may be included. In this case, all of the resin may be a fluorinated resin, or a part of the resin may be a fluorinated resin. The fluorinated resin may be a resin including fluorine, e.g., polytetrafluorethylene ("PTFE"). Moreover, the fluorinated resin may be perfluoroalkoxy alkane ("PFA"), for example. In addition, the fluorinated resin may be at least one of perfluoro ethylene propylene copolymer ("FEP"), and ethylene-tetrafluoroethylene ("ETFE"), for example. The fluorinated resin has a low refractive index. Therefore, by the fluorinated resin, the low refractive index layer 17 tends to have a lower refractive index, and the reflectance may be further reduced.

The hollow silica particles 172 include an outer layer, and the inside of the outer layer is hollow or a porous body. The outer layer and the porous body mainly include silicon oxide ($SiO_2$). Moreover, many photopolymerizable groups and hydroxyl groups are bonded with the surface of the outer layer. The photopolymerizable groups and the outer layer are bonded to each other through at least one of a Si—O—Si bond and a hydrogen bond. The photopolymerizable groups may include an acryloyl group and a methacryloyl group. That is, the hollow silica particles 172 include at least one of an acryloyl group and a methacryloyl group as the photopolymerizable group. The photopolymerizable group is also referred to as an ionizing-radiation-hardenable group. The hollow silica particles 172 may have at least a photopolymerizable group, and the number and type of functional groups thereof are not particularly limited.

The average primary particle diameter of the hollow silica particles 172 may be 35 nm or more and 120 nm or less. Moreover, it is preferable that the average primary particle diameter of the hollow silica particles 172 is 50 nm or more and 100 nm or less. When the average primary particle diameter is less than 35 nm, the porosity of the hollow silica particles 172 tends to be substantially small. Therefore, lowering the refractive index of the low refractive index layer 17 may be difficult. Moreover, when a median particle diameter exceeds 120 nm, unevenness of the surface of the low refractive index layer 17 tends to become remarkable. Therefore, antifouling property and scratch resistance are liable to decease.

The surface modifier 173 is mainly distributed on the surface side of the binder 171 and modifies the surface of the low refractive index layer 17. In other words, the surface modifier 173 is segregated on the surface side of the low refractive index layer 17. When it is exists in the inside of the binder 171, the function of the low refractive index layer 17 is not lowered.

In this embodiment, the surface modifier 173 may include at least one of an oil repellent surface modifier and a lipophilic surface modifier.

The oil repellent surface modifier serves to improve the oil repellency of the film surface by mixing with the binder 171 or the like and segregating it on the surface.

The oil repellent surface modifier may be a fluorine-type compound which has a photopolymerizable group.

The oil repellent surface modifier may include KY-1203 and KY-1207 manufactured by Shin-Etsu Chemical Co., Ltd, for example. Also, the oil repellent surface modifier may include OPTOOL DAC-HP manufactured by Daikin Industries, Ltd., for example. Also, the oil repellent surface modifier may include MEGAFAC F-477, F-554, F-556, F-570, RS-56, RS-58, RS-75, RS-78, and RS-90 manufactured by DIC Corporation, for example. Also, the oil repellent surface modifier may include FS-7024, FS-7025, FS-7026, FS-7031, and FS-7032 manufactured by Fluoro Technology Co., LTD., for example. Also, the oil repellent surface modifier may include H-3593 and H-3594 manufactured by DKS Co., Ltd., for example. Also, the oil repellent surface modifier may include SURECO AF Series manufactured by AGC Inc., for example. Also, the oil repellent surface modifier may include Futter Gento F-222F, M-250, 601AD, and 601ADH2 manufactured by the NEOS COMPANY LIMITED, for example.

The lipophilic surface modifier serves to improve the lipophilicity of the surface of the film by mixing with the binder 171 or the like and segregating it on the surface.

The lipophilic surface modifier may include MEL-AQUA 350L manufactured by Sanyo Chemical Industries, Ltd., for example. Also, it may include Futter Gento 730LM, 602A, 650A, and 650AC manufactured by the NEOS COMPANY LIMITED, for example.

<Description of the Structure of the Resin Film>

In addition, the structure of the resin film of this embodiment is not limited to the form illustrated in FIG. 2.

FIGS. 9A to 9E are views illustrating embodiments of the structure of resin film.

Figure 9A:
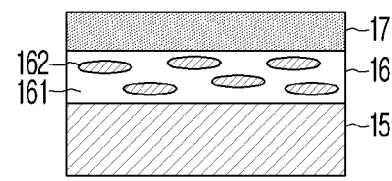
FIGS. 9A to 9E are views illustrating embodiments of the structure of resin film.

FIG. 9A is the same as the case of FIG. 2, and the substrate 15, the anisotropic diffusion layer 16, and the low refractive index layer 17 are laminated in this order.

Figure 9B:
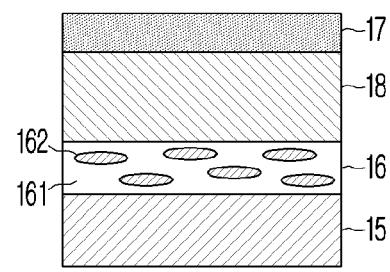

FIG. 9B is a view illustrating an example in which the substrate 15, the anisotropic diffusion layer 16, the hard coating layer 18, and the low refractive index layer 17 are laminated in this order. In other words, compared with the case of FIG. 9A, the hard coating layer 18 is formed between the anisotropic diffusion layer 16 and the low refractive index layer 17. In this case, the strength of the resin film may be improved. The refractive index of the hard coating layer 18 may be about 1.54 or more. Then, the reflectance may be reduced compared with the case where only the low refractive index layer 17 is provided. Accordingly, more excellent anti-reflection property may be provided.

Figure 9C:
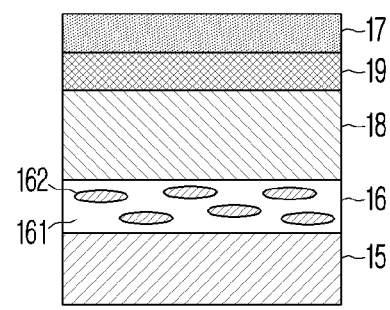

FIG. 9C is a view illustrating an example in which the substrate 15, the anisotropic diffusion layer 16, the hard coating layer 18, a high refractive index layer 19 and the low refractive index layer 17 are laminated in this order. In other words, compared with the case of FIG. 9B, the high refractive index layer 19 is formed between the hard coating layer 18 and the low refractive index layer 17. The high refractive index layer 19 is a layer having a higher refractive index than that of the low refractive index layer 17. The refractive index of the high refractive index layer 19 may be about 1.6 or more. Then, the reflectance may be reduced compared with the case where only the low refractive index layer 17 is provided. Accordingly, more excellent anti-reflection property may be provided.

Figure 9D:
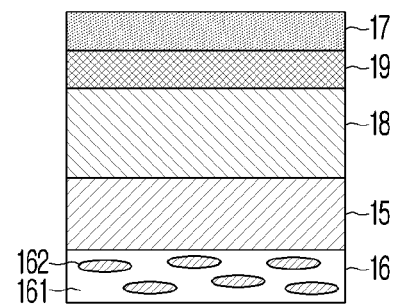

FIG. 9D is a view illustrating an example in which the anisotropic diffusion layer 16, the substrate 15, the hard coating layer 18, the high refractive index layer 19 and the low refractive index layer 17 are laminated in this order. In other words, compared with the case of FIG. 9A, the anisotropic diffusion layer 16 is moved to the inner side with respect to the substrate 15. In this case, it may be said that the substrate 15 is provided between the low refractive index layer 17 and the anisotropic diffusion layer 16.

Figure 9E:
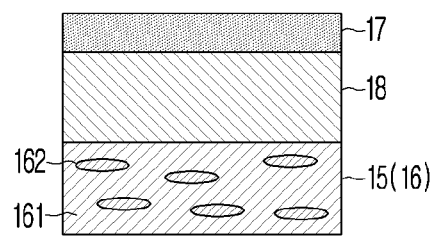

FIG. 9E shows a case in which the substrate 15 has the function of the anisotropic diffusion layer 16. In other words, the anisotropic particles 162 are dispersed in the resin constituting the substrate 15. In this case, the anisotropic diffusion layer 16 may function as the substrate 15 supporting the low refractive index layer 17.

The hard coating layer 18 is a functional layer for making it difficult for the liquid crystal display device 1a to be damaged. The hard coating layer 18 includes a binder as a base material including a resin as a main component, for example. As for the binder, the same thing as mentioned for the low refractive index layer 17 may be used.

In addition to the binder, metal oxide particles may be included. As the metal oxide particles, e.g., zirconium oxide, tin oxide, titanium oxide, cerium oxide, magnesium oxide or the like may be used. Then, the hard coat property of the hard coating layer 18 improves.

Moreover, a conductive material may be added. In an embodiment, the conductive material may be fine metal particles, a conductive polymer, or the like. In detail, the conductive material is tin oxide which is doped with antimony (Sb), phosphorus (P), and indium (In), an ionic liquid including a fluorine-based anion or ammonia salt, conductive polymers such as poly(3,4-ethylenedioxythiophene) polystyrene sulfonate ("PEDOT/PSS") or the like, carbon nanotubes, or the like, for example. In addition, the conductive material is not limited to one type. Two or more types of conductive materials may be added. Then, the surface resistance value of the hard coating layer 18 becomes low, and an antistatic function may be provided to the hard coating layer 18.

In order to reduce the reflection of the liquid crystal display device 1a, the refractive index of the hard coating layer 18 may be about 1.48 or more and about 1.65 or less. Moreover, it is preferable that the refractive index thereof is about 1.5 or more and 1.6 or less. Moreover, it is more preferable that the refractive index thereof is about 1.54 or more and 1.56 or less. The reflectance may be reduced by making the hard coating layer 18 have a high refractive index. However, when the refractive index of the hard coating layer 18 is too high, the angle dependence of the reflectance may deteriorate and adjustment of the color may be difficult.

The thickness of the hard coating layer 18 may be about 0.5 μm or more and about 20 μm or less. Moreover, it is preferable that the thickness of the hard coating layer 18 is about 3 μm or more and about 10 μm or less.

The high refractive index layer 19 is provided under the low refractive index layer 17, and is a functional layer for further reducing the reflectance.

The high refractive index layer 19 includes a binder and high refractive index particles. The high refractive index layer 19 may be formed with a coating solution including the binder and high refractive index particles, for example. The high refractive index layer 19 may be formed as a single layer or as a multilayer. The high refractive index layer 19 may be formed with as few layers as possible from the viewpoint of manufacturing cost.

In order to reduce reflection of the liquid crystal display device 1a, the refractive index of the high refractive index layer 19 may be high. In detail, the refractive index of the high refractive index layer 19 may be about 1.55 or more and about 1.80 or less. Moreover, it is preferable that it is about 1.60 or more and about 1.75 or less.

The upper limit of the thickness of the high refractive index layer 19 may be about 500 nm or less. Moreover, it is preferable that the upper limit of the thickness of the high refractive index layer 19 is about 350 nm or less, and about 200 nm or less is more preferable. The lower limit of the thickness of the high refractive index layer 19 may be about 50 nm or more. Moreover, it is preferable that the lower limit of the thickness of the high refractive index layer 19 is about 80 nm or less, and about 100 nm or more is more preferable.

Examples of the high refractive index particles may include zirconium oxide, hafnium (IV) oxide, tantalum oxide, titanium oxide, zinc oxide, aluminum oxide, magnesium oxide, tin oxide, yttrium oxide, barium titanate, antimony-doped tin oxide ("ATO"), phosphorus-doped tin oxide ("PTO"), indium-doped tin oxide ("ITO"), and zinc sulfide. From the viewpoint of durability and stability, particularly preferred are zirconium oxide, barium titanate, ATO, PTO, and ITO.

<Description of the Manufacturing Method of the Resin Film>

Next, a method for manufacturing the resin film having the layer structure illustrated in FIG. 2 will be described.

Figure 10A:
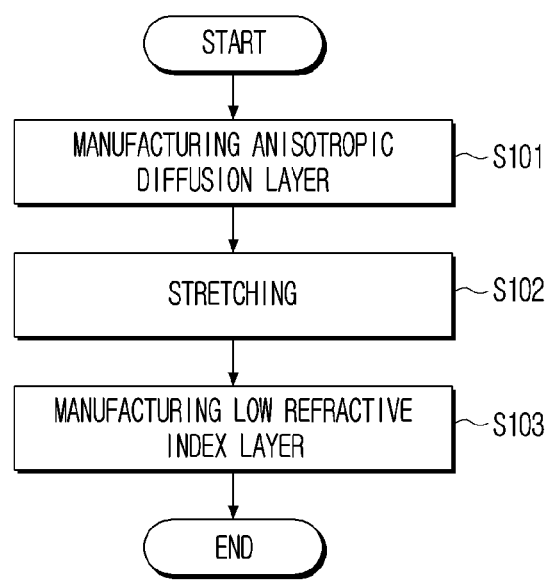
FIG. 10A is a flowchart illustrating a method for manufacturing a resin film having a layer structure as illustrated in FIG. 2.

FIG. 10A is a flowchart illustrating a method for manufacturing the resin film having the layer structure illustrated in FIG. 2.

First, the anisotropic diffusion layer 16 is manufactured (S101: anisotropic diffusion layer manufacturing process). The anisotropic diffusion layer 16 may be coated on the substrate 15, or may be formed as an anisotropic diffusion film by melting extrusion or the like.

When desired, the anisotropic diffusion layer 16 is stretched (S102: stretching process). By stretching the anisotropic diffusion layer 16, the orientation of the anisotropic particles 162 may be improved, and the anisotropic diffusion property may be improved. In addition, by stretching the anisotropic diffusion layer 16 including organic particles such as (meta) acrylic resin, polystyrene resin, melamine resin or the like near the glass transition point of the resins, the organic particles are formed in an anisotropic shape, and the anisotropic diffusion property is significantly improved. In other words, before stretching, it is an isotropic diffusion film including isotropic particles. By stretching it, the isotropic particles are changed to anisotropic particles 162. As a result, an anisotropic diffusion film including the anisotropic particles 162 is obtained.

Further, on the anisotropic diffusion layer 16, a low refractive index layer 17 is manufactured (S103: low refractive index layer manufacturing process).

Each of the anisotropic diffusion layer 16 and the low refractive index layer 17 may be manufactured by the following method.

Figure 10B:
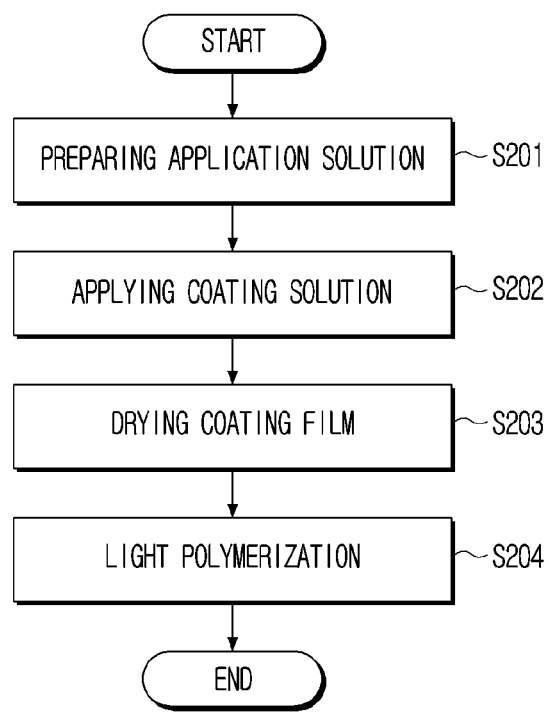
FIG. 10B is a flowchart illustrating a method for manufacturing an anisotropic diffusion layer and a low refractive index layer.

FIG. 10B is a flowchart for explaining a method for manufacturing the anisotropic diffusion layer 16 and the low refractive index layer 17.

First, a coating solution for forming each layer is prepared (S201: preparation process). Here, 'preparation' includes not only the case of preparing by manufacturing the coating solution, but also the case of preparing by purchasing the coating solution.

The coating solution includes solid content and a solvent.

In the case of manufacturing the anisotropic diffusion layer 16, the solid content includes a monomer, an oligomer, and a polymer used as a basis for the resin part 161. In addition, the solid content includes the anisotropic particles 162. The monomer and/or oligomer are polymerized to form a resin included in the resin part 161. In this embodiment, the polymerization includes photo-polymerization, thermal polymerization, or the like. Hereinafter, the monomer and/or oligomer may be also referred to as a 'binder component'.

When manufacturing the low refractive index layer 17, the solid content includes the binder component serving as a basis for the binder 171. In addition, the solid content includes the hollow silica particles 172 and the surface modifier 173.

Moreover, a photo-initiator is included as the solid content of each layer. A dispersing agent, an antifoamer, an ultraviolet absorber, a leveling agent, etc., may be included as the solid content.

The coating solution for each layer may be manufactured by throwing-in each solid content to the solvent and stirring it.

The solvent disperses the solid content. As the solvent, methylene chloride, toluene, xylene, ethyl acetate, butyl acetate, and acetone may be used, for example. In addition, methyl ethyl ketone ("MEK"), methyl isobutyl ketone ("MIBK"), ethanol, methanol, and n-propyl alcohol may be used.

Returning to FIG. 10B, next, the coating solution is applied to manufacture a coating film (S202: coating process). A method of performing the coating is not particularly limited, but may be performed by a die method or a micro gravure method. In an alternative embodiment, a method of manufacturing a film-like body having a uniform thickness by centrifugal force by titration and rotation of the coating solution may be employed. The coating solution may be applied while being warmed.

At this time, the surface modifier of the low refractive index layer 17 segregates on the surface side of the coating film.

Further, the applied coating film is dried (S203: drying process). Drying may be performed by leaving it at room temperature to volatilize the solvent, or by forcibly removing the solvent by heating or vacuuming.

Then, light of energy, such as ultraviolet rays, heat, or the like is irradiated to polymerize the binder component in the coating film. Due to this, the binder component in the coating film is hardened to become the resin part 161 and the binder 171 (S204: polymerization process). By the above processes, each of the anisotropic diffusion layer 16 and the low refractive index layer 17 may be formed. In addition, the drying process and the polymerization process may be recognized as a hardening process which hardens the applied coating solution.

<Description of the Effect when the Anisotropic Diffusion Layer 16 and the Lens Sheet are Provided>

Figure 11:
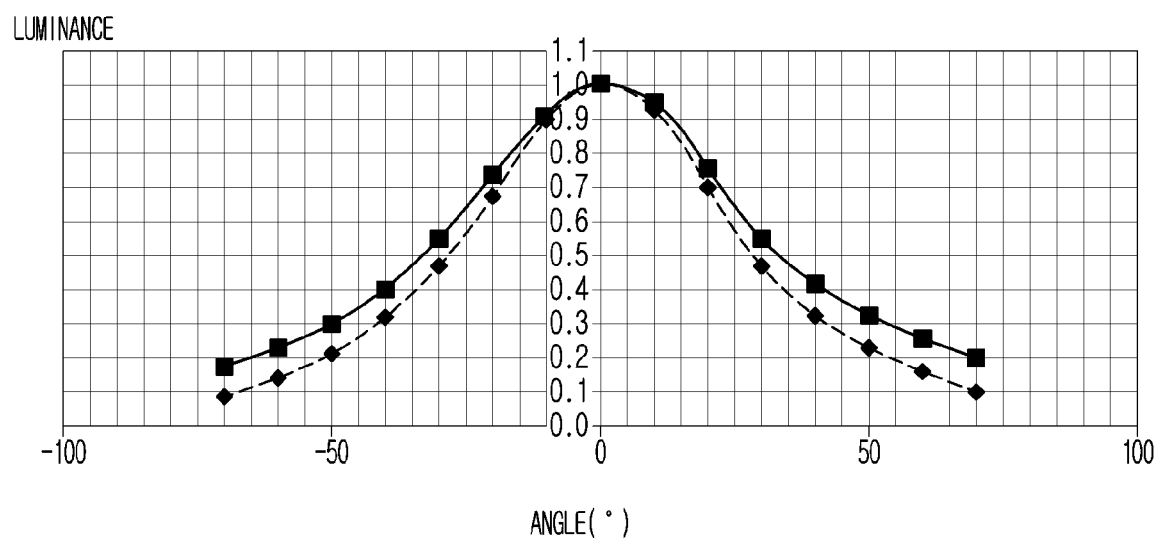
FIG. 11 is a view illustrating an effect when an anisotropic diffusion layer is provided.

FIG. 11 is a view illustrating an effect when the anisotropic diffusion layer 16 is provided.

FIG. 11 is a view illustrating a luminance distribution that is a relationship between the luminance and the angle with respect to the front direction. Here, the horizontal axis represents the angle with respect to the front direction. The vertical axis represents the luminance. The luminance when the front luminance is normalized to 1.0 is shown.

The solid line represents the case where the anisotropic diffusion layer 16 is provided. In other words, when the anisotropic diffusion layer 16 is provided, the embodiment of the luminance distribution of the light emitted from the liquid crystal display device 1a is shown. In addition, the dotted line represents the case where the anisotropic diffusion layer 16 is not provided. In other words, when the anisotropic diffusion layer 16 is not provided, the embodiment of the luminance distribution of the light emitted from the liquid crystal display device 1a is shown.

The case of the solid line in which the anisotropic diffusion layer 16 is provided is compared with the case of the dotted line in which the anisotropic diffusion layer 16 is not provided. As a result, in the region of 40 degrees or more and 60 degrees or less and the region of −60 degrees or more and −40 degrees or less, the case in which the anisotropic diffusion layer 16 is provided has higher luminance. Moreover, particularly, in the region of 50 degrees or more and 60 degrees or less and the region of −60 degrees or more and −50 degrees or less, the luminance is high. This shows that at angles other than the front direction, the luminance is substantially high and the viewing angle characteristic is improved. However, in the region of 20 degrees or more and 40 degrees or less and the region of −40 degrees or more and −20 degrees or less, there is little difference between both cases. In other words, at this angle, the luminance is hardly different from that of the prior art. Therefore, although the viewing angle characteristic is improved by providing the anisotropic diffusion layer 16, in this region, the improvement thereof is insufficient.

Thus, in this embodiment, in addition to the anisotropic diffusion layer 16, the lens sheet is provided in the backlight device 11. The lens sheet includes the first lens sheet 114 and the second lens sheet 115 described above. Further, the difference in light collecting properties of these two lens sheets, the thickness of the adhesive layer, or the like are used. For this reason, when an image is displayed, the light collecting property in the left-right direction and the light collecting property in the up-down direction are made to be different. In this way, a solution to this problem is attempted.

FIG. 12 is a table illustrating effects when the anisotropic diffusion layer 16 and the lens sheet are provided.

In the illustrated table, each item of 'conventional', 'anisotropic diffusion layer+lens sheet', 'lens sheet change', and 'anisotropic diffusion layer+lens sheet change' is arranged in the horizontal direction in the table. In addition, in 'anisotropic diffusion layer+lens sheet' and 'lens sheet change', the luminance distribution is divided into 'front priority' and 'viewing angle priority'. The 'front priority' is the case in which the lens sheet structure or the anisotropic diffusion layer 16 giving priority to the front luminance is applied. The 'viewing angle priority' is the case in which the lens sheet structure or the anisotropic diffusion layer 16 giving priority to the viewing angle is applied. In the illustrated table, items of 'structure', 'front characteristic', and 'viewing angle characteristic' are arranged in the vertical direction in the table.

The 'structure' is the layer structure for each of 'conventional', 'anisotropic diffusion layer+lens sheet', 'lens sheet change', and 'anisotropic diffusion layer+lens sheet change'.

In other words, the 'conventional' uses two lens sheets, one for collecting light in the left-right direction and one for collecting light in the up-down direction. Both of the lens sheets are prism sheets with the same light collecting property. In this case, the anisotropic diffusion layer 16 is not provided.

In addition, in the 'anisotropic diffusion layer+lens sheet', in addition to the two lens sheets, the anisotropic diffusion layer 16 is provided. Both of the lens sheets are prism sheets with the same light collecting property. In the case of 'front priority', an anisotropic diffusion layer of low diffusion with low light diffusivity is used as the anisotropic diffusion layer 16. In the case of 'viewing angle priority', an anisotropic diffusion layer of high diffusion with high light diffusivity is used as the anisotropic diffusion layer 16.

In addition, in the 'lens sheet change', the lens sheet is changed with respect to the structure of the 'conventional'. In other words, the light collecting properties of the lens sheets in the up-down direction and the left-right direction are different. In this case, as the lens sheet for collecting light in the up-down direction, a prism sheet with higher light collecting property is used. As the lens sheet for collecting light in the left-right direction, a lenticular sheet with a lower light collecting property is used. Also, the anisotropic diffusion layer 16 is not manufactured.

In addition, the 'anisotropic diffusion layer+lens sheet change' is the case in which the anisotropic diffusion layer 16 is provided at the same time as the lens sheet is changed. In other words, compared to the case of the 'anisotropic diffusion layer+lens sheet', the lens sheet is changed. That is, as the lens sheet for collecting light in the up-down direction, a prism sheet with higher light collecting property is used. As the lens sheet for collecting light in the left-right direction, a lenticular sheet with a lower light collecting property is used.

The 'front characteristic' is a characteristic for the front luminance and the front contrast (front CR). The front luminance is the luminance in the front direction. In addition, the front contrast (front CR) is the contrast in the front direction. Here, the case of the 'conventional' is standardized as 100 of the reference (Ref), and each characteristic is described based on this.

In addition, the 'viewing angle characteristic' is a characteristics for 30° luminance, 60° luminance, an FWHM of luminance distribution, and Δu'v' (color change). Among them, the '30° luminance' is the luminance when viewed from an angle of about 30° with respect to the front direction. The '60° luminance' is the luminance when viewed from an angle of about 60° with respect to the front direction. For the 30° luminance and 60° luminance, each characteristic is described by standardizing the front luminance as about 100%. In this case, the 30° luminance and the 60° luminance indicate that the luminance becomes smaller than the front luminance as the numeral value becomes smaller than about 100%. In addition, the FWHM is the full width (L1 for the left-right direction and L2 for the up-down direction) at half the maximum amplitude as described in FIG. 6, and is an angle at which the luminance is half of the front luminance. In this case, it is preferable that the FWHM is larger. In addition, Δu'v' (color change) is a color change when viewed from a direction 60° to the front direction, and the lower it is, the better.

These characteristics were measured by the following method. For the measurement, the liquid crystal display device 1a for evaluation which satisfies the above-described conditions was manufactured. On the backlight device 11, the liquid crystal display panel having the above-described structure was disposed. In this arrangement, the polarization plane from which the light is emitted from the backlight device 11 and the polarization plane of the polarizing plate disposed on the incident plane side of the liquid crystal display panel are the same. The measurement was performed using a conoScope (polarizing mirror) manufactured by Autronic-Melchers GmbH. At this case, the diffusion direction of the prepared sample is made to be the lateral direction of the display. Then, in the case of black display (gradation 0) and white display (gradation 255), the luminance distribution (−80° or more and +80° or less) in the lateral direction of the liquid crystal display device 1a was measured. The 30° luminance and the 60° luminance employ average values of luminance of −30° and +30° and −60° and +60°, respectively. Further, the FWHM was calculated from the luminance distribution. In addition, the ratio of the luminance at the time of white display and the luminance at the time of black display was made into contrast. Chromaticity was calculated using CIE 1876USC color space system (u'v'). The chromaticity change was defined as the distance Δu'v' in the u'v' coordinate system of each chromaticity when viewed from the front and 60° in white display. In this case, the distance Δu'v' may be referred to as a Euclidean distance in the u'v' color space.

In FIG. 12, in the case of the 'conventional', the frontal characteristic is good, but the 30° luminance and the 60° luminance are low. In other words, the viewing angle characteristics is insufficient. In addition, the FWHM is substantially small. Also, Δu'v' (color change) is substantially large.

When it is set as the 'lens sheet change' with the intention of improving the viewing angle characteristic, the 30° luminance is improved so that FWHM becomes substantially large. However, the improvement of the 60° luminance is substantially small, and there is no improvement in the color change (Δu'v') when observed in the diagonal direction. In other words, the viewing angle characteristic is insufficient. By further lowering the light collecting property of the first lens sheet 114, the 60° luminance may be improved, but the front luminance is greatly reduced.

In the case of the 'anisotropic diffusion layer+lens sheet', the 30° luminance and the 60° luminance are increased and improved compared to the 'conventional'. In addition, the FWHM is substantially larger and improved compared to the 'conventional'. Also, in the case of the 'anisotropic diffusion layer+lens sheet', Δu'v' (color change) is reduced. Accordingly, the viewing angle characteristic is totally improved, and there is an improvement effect. However, the improvement width of the 30° luminance and the FWHM is substantially small, and the viewing angle characteristic is insufficient. By the increasing the diffusivity of the anisotropic diffusion layer 16, the 30° luminance and the FWHM are slightly improved, but the front luminance and contrast are significantly lowered.

In addition, in the case of the 'anisotropic diffusion layer+lens sheet change', the 30° luminance and the 60° luminance are further increased compared to the 'anisotropic diffusion layer+lens sheet', and are significantly improved compared to the 'conventional'. In addition, the FWHM is larger and improved compared to the 'anisotropic diffusion layer+lens sheet'. Also, similarly to the 'anisotropic diffusion layer+lens sheet', Δu'v' (color change) is substantially small. Therefore, the whole of the viewing angle characteristic is greatly improved, and there is a substantially large improvement effect. The decrease in the front luminance and the front contrast is also substantially small, and sufficient front characteristics may be ensured.

Figure 13:
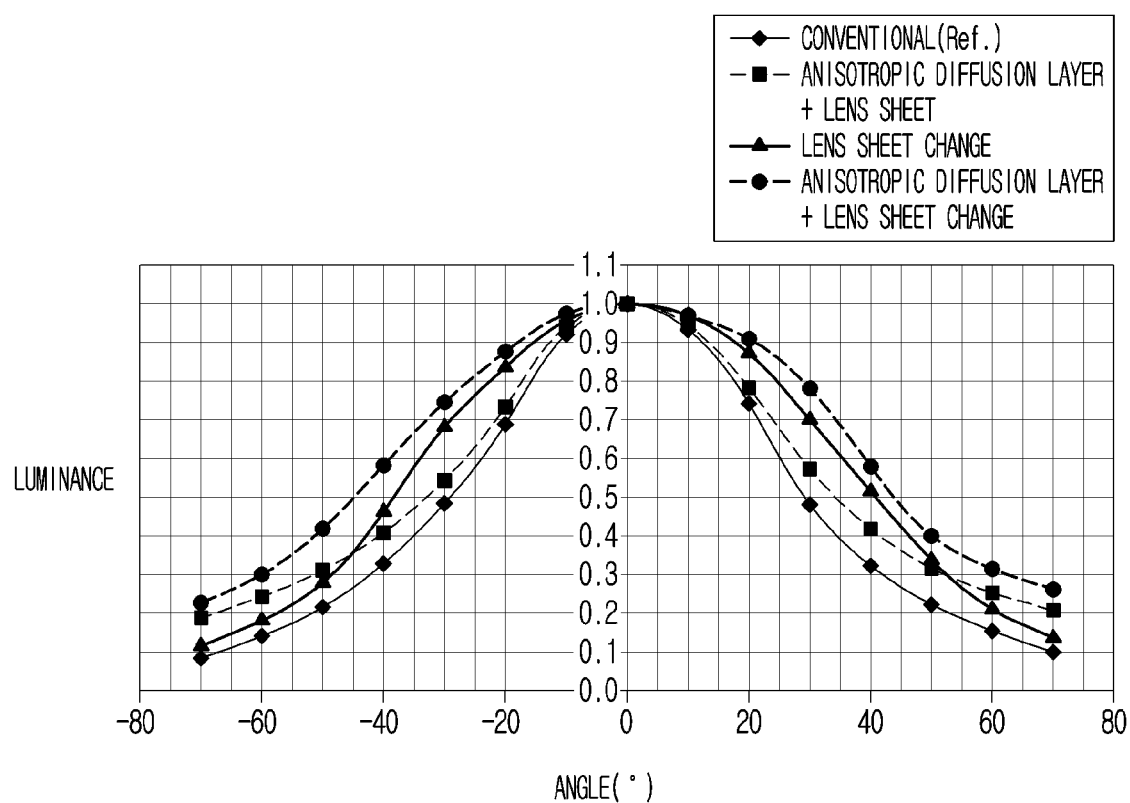
FIG. 13 is a view illustrating a luminance distribution that is a relationship between an angle and a luminance with respect to a front direction.

FIG. 13 is a view illustrating a luminance distribution that is a relationship between an angle and a luminance with respect to a front direction. Here, the horizontal axis represents the angle with respect to the front direction. The vertical axis represents the luminance. The luminance when the front luminance is normalized to 1.0 is shown.

The luminance distribution is shown for each of 'conventional', 'lens sheet change', 'anisotropic diffusion layer+lens sheet', and 'anisotropic diffusion layer+lens sheet change'. According to this, in the case of the 'anisotropic diffusion layer+lens sheet change', it may be seen that the improvement effect of the luminance distribution is substantially large. Compared to the case of FIG. 11, the luminance is increased and the luminance distribution is improved in the region of 20° or more and 40° or less. Moreover, the luminance becomes substantially large and the luminance distribution is improved in the region of −40° or more and −20° or less.

Embodiments

Hereinafter, the disclosure will be described in more detail using embodiments. The disclosure is not limited by these embodiments unless the gist thereof is exceeded.

First, the manufacturing method of the liquid crystal display device 1a is described. Here, the liquid crystal display device 1a was manufactured by the method shown below.

[Backlight Device 11]

First, the backlight device 11 was manufactured as follows.

An acrylic adhesive having a viscosity of 50 megapascal seconds (mPa·s) was coated on the rear surface (the light incident surface side) to a predetermined thickness. As the reflective polarizing sheet 116, DBEF-D2-400 manufactured by Sumitomo 3M Limited was used.

Next, the prism ridges of the second lens sheet 115 was brought into contact with the adhesive, and ultraviolet rays of 300 millijoule/square centimeter ($mJ/cm^2$) were irradiated to unite the two sheets.

Thereafter, the acrylic adhesive was applied to a predetermined thickness on the rear surface (the surface on which the prisms are not formed) of the second lens sheet 115. At this time, the prism formation surface of the first lens sheet 114 was brought into contact with the second lens sheet 115 so that the prism ridges thereof were orthogonal to each other. Moreover, in the case of the microlens array sheet, the direction with high light collecting property was made to be orthogonal to it. Then, the adhesive was cured by irradiating ultraviolet rays of 300 $mJ/cm^2$. In this way, a composite lens sheet for a backlight unit including the first lens sheet 114, the second lens sheet 115, and the reflective polarizing sheet 116 was manufactured.

Further, the diffusion plate 112 and the color conversion sheet 113 including the quantum dots was disposed on the light source 111 (blue LEDs) arranged at intervals of 1 centimeter (cm). Then, the composite lens sheet for a backlight unit was placed thereon to form the backlight device 11.

The backlight device 11 was manufactured using the lens sheet shown in Table 1 below. In other words, prism sheets 1 to 3, lenticular sheets 1 and 2, and microlens array sheets 1 and 2 were used. In addition, in the Table, the prism sheets 1 to 3 may be described as P sheets 1 to 3. The lenticular sheets 1 and 2 may be described as LL sheets 1 and 2. The microlens array sheets 1 and 2 may be described as MLA sheets 1 and 2.

And using these lens sheets, the backlight devices 11 having the structures 1-17 shown in following Tables 2 and 3 were manufactured.

In addition, in Tables 2 and 3, the difference (ΔFWHM) of the FWHM was measured as follows. First, a liquid crystal display panel of the VA type including the outermost surface which is a TAC film was prepared. Also, this was disposed on the backlight device 11 to form the liquid crystal display device 1a. Then, the luminance distribution in the left-right direction and the up-down direction of the liquid crystal display device 1a was measured using the conoScope (polarizing mirror) manufactured by Autronic-Melchers. In addition, the FWHM of each of the left-right direction and the up-down direction was measured from the measured luminance distribution. The difference between the FWHMs in the left-right direction and the up-down direction was defined as the difference (ΔFWHM) in the FWHM. In the Tables below, 'μm' may be also described as 'um'.

TABLE 1

| LENS SHEET NAME | SUBSTRATE | SHAPE RESIN | PITCH | APEX ANGLE |
| --- | --- | --- | --- | --- |
| PRISM SHEET 1 (P SHEET 1) | 150 umPET | ACRYLIC RESIN | 70 um | 90° |
| PRISM SHEET 2 (P SHEET 2) | 150 umPET | ACRYLIC RESIN | 70 um | 115° |
| PRISM SHEET 3 (P SHEET 3) | 150 umPET | ACRYLIC RESIN | 70 um | 60° |

TABLE 1-continued

| LENS SHEET NAME | SUBSTRATE | SHAPE RESIN | PITCH | HEIGHT |
|---|---|---|---|---|
| LENTICULAR LENS SHEET 1 (LL SHEET 1) | 150 umPET | ACRYLIC RESIN | 60 um | 25 um |
| LENTICULAR LENS SHEET 2 (LL SHEET 2) | 150 umPET | ACRYLIC RESIN | 180 um | 40 um |

| LENS SHEET NAME | SUBSTRATE | SHAPE RESIN | DIAMETER | HEIGHT |
|---|---|---|---|---|
| MICROLENS ARRAY SHEET 1 (MLA SHEET 1) | 150 umPET | ACRYLIC RESIN | 45 um | 20 um |
| MICROLENS ARRAY SHEET 2 (MLA SHEET 2) | 150 umPET | ACRYLIC RESIN | 140 um | 65 um |

TABLE 2

|  | STRUCTURE 1 | STRUCTURE 2 | STRUCTURE 3 | STRUCTURE 4 | STRUCTURE 5 | STRUCTURE 6 | STRUCTURE 7 | STRUCTURE 8 |
|---|---|---|---|---|---|---|---|---|
| THICKNESS OF ADHESIVE LAYER BETWEEN SECOND LENS SHEET AND REFLECTIVE POLARIZING SHEET | 5 um | 5 um | 5 um | 5 um | 5 um | 5 um | 5 um | 5 um |
| SECOND LENS SHEET | P SHEET 1 | P SHEET 1 | P SHEET 1 | P SHEET 1 | P SHEET 1 | P SHEET 1 | P SHEET 1 | P SHEET 1 |
| THICKNESS OF ADHESIVE LAYER BETWEEN FIRST AND SECOND LENS SHEETS | 15 um | 15 um | 5 um | 5 um | 5 um | 5 um | 5 um | 5 um |
| FIRST LENS SHEET | P SHEET 1 | P SHEET 2 | P SHEET 2 | P SHEET 3 | LL SHEET 1 | LL SHEET 2 | MLA SHEET 1 | MLA SHEET 2 |
| FWHM IN LEFT-RIGHT DIRECTION (°) | 84 | 84 | 82 | 82 | 82 | 80 | 82 | 82 |
| FWHM IN UP-DOWN DIRECTION (°) | 68 | 66 | 68 | 70 | 72 | 68 | 72 | 72 |
| Δ FWHM (°) | 16 | 18 | 14 | 12 | 10 | 12 | 10 | 10 |
| FRONT LUMINANCE (cd/m²) | 980 | 970 | 1010 | 1000 | 930 | 910 | 870 | 870 |

TABLE 3

|  | STRUCTURE 9 | STRUCTURE 10 | STRUCTURE 11 | STRUCTURE 12 | STRUCTURE 13 | STRUCTURE 14 | STRUCTURE 15 | STRUCTURE 16 | STRUCTURE 17 |
|---|---|---|---|---|---|---|---|---|---|
| THICKNESS OF ADHESIVE LAYER BETWEEN SECOND LENS SHEET AND REFLECTIVE POLARIZING SHEET | 5 um | NONE | 5 um | 5 um | 5 um | 5 um | 5 um | 15 um | NONE |
| SECOND LENS SHEET | P SHEET 1 | P SHEET 1 | P SHEET 1 | LL SHEET 1 | MLA SHEET 2 | LL SHEET 1 | MLA SHEET 1 | P SHEET 1 | NONE |
| THICKNESS OF ADHESIVE LAYER BETWEEN FIRST AND SECOND LENS SHEETS | NONE | NONE | 5 um | 5 um | 5 um | 5 um | 5 um | 5 um | 5 um |
| FIRST LENS SHEET | LL SHEET 1 | LL SHEET 1 | P SHEET 1 | LL SHEET 1 | MLA SHEET 2 | P SHEET 1 | P SHEET 1 | P SHEET 1 | P SHEET 2 |
| FWHM IN LEFT-RIGHT DIRECTION (°) | 81 | 80 | 62 | 70 | 74 | 72 | 72 | 70 | 86 |
| FWHM IN UP-DOWN DIRECTION (°) | 70 | 72 | 60 | 69 | 70 | 80 | 84 | 86 | 70 |
| Δ FWHM (°) | 11 | 9 | 2 | 1 | 4 | −8 | −12 | −16 | 16 |
| FRONT LUMINANCE (cd/m²) | 340 | 950 | 1080 | 850 | 790 | 920 | 860 | 960 | 700 |

[Bonding of Backlight Device 11 and Liquid Crystal Display Panel]

Next, a liquid crystal display panel of the VA type including the outermost surface which is a TAC film was prepared. The liquid crystal display panel includes a retardation film 13a, a liquid crystal part 14, a retardation film 13b, a polarizing film 12b, and the TAC film. In this case, unlike the liquid crystal display device 1a illustrated in FIGS. 2 and 9(b), the substrate 15, the anisotropic diffusion layer 16, the hard coating layer 18, and the low refractive index layer 17 are not provided. Then, the liquid crystal display panel was disposed on the backlight device 11.

[Manufacturing of the Liquid Crystal Display Device 1a]

After that, the anisotropic diffusion layer 16, the hard coating layer 18, and the low refractive index layer 17 were further formed, thereby manufacturing the liquid crystal display device 1a. At this time, as the liquid crystal display device 1a, five types of liquid crystal display devices Panel 1 to Panel 5 were manufactured. In addition, the anisotropic diffusivity (ADV) of the following antireflection film is measured using the Gonio photometer GP-200 manufactured by MURAKAMI COLOR RESEARCH LABORATORY CO., LTD. The antireflection film was placed so that the incident light was perpendicular to the evaluation surface, and the luminance distribution (−50° or more and +50° or less) in the anisotropic diffusion direction and the perpendicular direction of the transmitted light was measured. Then, the ratio of the amount of transmitted light at 5° in the anisotropic diffusion direction to the amount of transmitted light at 5° in the direction perpendicular to the anisotropic diffusion direction was defined as ADV (anisotropic scattering degree).

(Liquid Crystal Display Device Panel 1)

The liquid crystal display device Panel 1 was manufactured as follows.

An acrylic oligomer having an acryloyl group was dissolved in a mixed solvent of MEK and MIBK. The refractive index of the acrylic oligomer is about 1.51. Needle-shaped calcium carbonate particles are mixed with this liquid mixture at 80 parts by mass with respect to 100 parts by mass of acrylic oligomer. The needle-shaped calcium carbonate has an average long axis length of about 20 μm, an average short length of about 0.6 μm, a long axis refractive index of 1.66, and a short axis refractive index of 1.50. Moreover, 4 parts by mass of photoinitiators were mixed. As the photoinitiators, Irgacure 127 manufactured by IGM Resin was used. Then, MEK and dimethyl carbonate were added to adjust the solid content concentration to be about 65 mass %.

This composition was coated on the TAC film (substrate 15) using a bar coater, and dried at 80 degrees Celsius (° C.) for 2 minutes. Then, it was cured by irradiating a high-pressure mercury lamp with an illuminance of 200 milliwatt per square centimeter (mW/cm²) for 3 seconds. The TAC film having a film thickness of about 60 μm was used. Therefore, the anisotropic diffusion layer 16 was obtained on the TAC film (substrate 15). The anisotropic diffusion layer 16 had the film thickness of about 10 μm.

Moreover, HC-1 and LR-1 were coated on the anisotropic diffusion layer 16 using the bar coater. HC-1 is a coating solution for forming the hard coating layer 18. The LR-1 is a coating solution for forming the low refractive index layer 17. Methods for producing HC-1 and LR-1 will be described later. At this time, the hard coating layer 18 had a film thickness of about 5 μm. The low refractive index layer 17 had a film thickness of about 98 nm. Therefore, the antireflection film provided with the anisotropic diffusion layer 16 was manufactured. As a result of measuring the anisotropic diffusivity (ADV) of the antireflection film, the measured anisotropic diffusivity (ADV) was 30.

Also, the antireflection film was bonded on the TAC film of the above-described liquid crystal display panel with the acrylic transparent adhesive film having a thickness of about 5 μm.

(Liquid Crystal Display Device Panel 2)

The liquid crystal display device Panel 2 was manufactured as follows.

A polymethyl methacrylate resin was dissolved in a mixed solvent of MEK and MIBK. The refractive index of the polymethyl methacrylate resin is about 1.50. The polystyrene particles were mixed with this liquid mixture at 30 parts by mass with respect to 100 parts by mass of the resin. The polystyrene particle has an average particle diameter of about 5 μm and a refractive index of about 1.60. Then, MEK was added to adjust the solid content concentration to be about 50 mass %.

This composition was coated on the release-treated PET film using the bar coater, and dried at 80° C. for 2 minutes. Then, the anisotropic diffusion layer 16 before stretching which has a film thickness of about 300 μm was obtained by peeling off the dried composition from the release-treated PET film. The anisotropic diffusion layer 16 was obtained by stretching this anisotropic diffusion layer 16 in the atmosphere of glass transition point vicinity (90° C. or more and 150° C. or less) of polystyrene.

HC-1 and LR-1 were coated on the anisotropic diffusion layer 16 using the bar coater. At this time, the hard coating layer 18 had a film thickness of about 10 μm. The low refractive index layer 17 had a film thickness of about 98 nm. As a result of measuring the anisotropic diffusivity (ADV) of the antireflection film, the measured anisotropic diffusivity (ADV) was 5.

Also, the antireflection film was bonded on the TAC film of the above-described liquid crystal display panel with the acrylic transparent adhesive film with a thickness of about 5 μm. In this case, the TAC film of the liquid crystal display panel serves as the substrate 15.

(Liquid Crystal Display Device Panel 3)

The liquid crystal display device Panel 3 was manufactured as follows.

HC-1 was coated on the TAC film having a thickness of about 60 nm using the bar coater, and dried 80° C. for 1 minute. Thereafter, curing was performed by irradiating a high-pressure mercury lamp with an illuminance of 100 mW/cm² for 2 seconds. As a result, the hard coating layer 18 with a film thickness of about 5 μm was formed.

Furthermore, LR-1 was coated on the hard coating layer 18, and dried at 60° C. for 2 minutes. Thereafter, curing was performed under the same condition as the hard coating layer 18. As a result, the low refractive index layer 17 with a film thickness of about 98 nm was formed, and the antireflection film was obtained.

In addition, an acrylic adhesive polymer obtained by copolymerizing butyl acrylate and acrylic acid was prepared. This acrylic adhesive polymer has a weight average molecular weight of 100,000 and a refractive index of about 1.51. Then, the acrylic adhesive polymer was dissolved in a mixed solvent of MEK and MIBK. Needle-shaped calcium carbonate particles are mixed with this liquid mixture at 60 parts by mass with respect to 100 parts by mass of acrylic oligomer. The needle-shaped calcium carbonate has an average long axis length of about 20 μm, an average short length of about 0.6 μm, a long axis refractive index of 1.66, and a short axis refractive index of 1.50. Also, 0.5 parts by mass of isocyanate type curing agent was mixed further. Then, MEK and dimethyl carbonate were added to adjust the solid content concentration to be about 65 mass %.

This composition was coated on the rear surface of the antireflection film (the surface on which the low refractive index layer 17 is not formed) using the bar coater. Thereafter, by drying at 100° C. for 3 minutes, an adhesive layer having the anisotropic diffusivity and the film thickness of about 15 μm was formed on the rear surface of the antireflection film. As a result of measuring the anisotropic diffusivity (ADV) of the antireflection film which has the adhesive layer, the measured anisotropic diffusivity (ADV) was 35.

Then, the antireflection film was bonded on the TAC film of the liquid crystal display panel through the adhesive layer. In this case, the TAC film of the liquid crystal display panel serves as the substrate 15.

(Liquid Crystal Display Device Panel 4)

The liquid crystal display device Panel 4 was manufactured as follows.

HC-1 was coated on the TAC film having a thickness of about 60 nm using the bar coater, and dried at 80° C. for 1 minute. Thereafter, curing was performed by irradiating a high-pressure mercury lamp with an illuminance of 100 mW/cm² for 2 seconds. As a result, the hard coating layer 18 with a film thickness of about 5 μm was formed.

Furthermore, LR-1 was coated on the hard coating layer 18, and dried at 60° C. for 2 minutes. Thereafter, curing was performed under the same condition as the hard coating layer 18. As a result, the low refractive index layer 17 with a film thickness of about 98 nm was formed, and the antireflection film which does not have the anisotropic diffusion layer 16 was manufactured. As a result of measuring the anisotropic diffusivity (ADV) of the antireflection film, the measured anisotropic diffusivity (ADV) was 0.1.

The antireflection film was bonded on the TAC film of the liquid crystal display panel with an acrylic transparent adhesive film with a thickness of about 5 μm.

(Liquid Crystal Display Device Panel 5)

The liquid crystal display device Panel 5 was manufactured as follows.

An acrylic oligomer having an acryloyl group was dissolved in a mixed solvent of MEK and MIBK. The refractive index of the acrylic oligomer is about 1.51. Needle-shaped calcium carbonate particles were mixed with this liquid mixture at 200 parts by mass with respect to 100 parts by mass of acrylic oligomer. The needle-shaped calcium carbonate has an average long axis length of about 20 μm, an average short length of about 0.6 μm, a long axis refractive index of 1.66, and a short axis refractive index of 1.50. Moreover, 4 parts by mass of photoinitiators were mixed. As the photoinitiators, Irgacure 127 manufactured by IGM Resin was used. Then, MEK and dimethyl carbonate were added to adjust the solid content concentration to be about 65 mass %.

This composition was coated on the TAC film (substrate 15) using the bar coater, and dried at 80° C. for 2 minutes. Then, it was cured by irradiating a high-pressure mercury lamp with an illuminance of 200 mW/cm² for 3 seconds. The TAC film having a film thickness of about 60 μm was used. Therefore, the anisotropic diffusion layer was obtained on the TAC film (substrate 15). The anisotropic diffusion layer 16 had the film thickness of about 10 μm.

Moreover, HC-1 and LR-1 were coated on the anisotropic diffusion layer 16 using the bar coater. At this time, the hard coating layer 18 had a film thickness of about 5 μm. The low refractive index layer 17 had a film thickness of about 98 nm. Therefore, the antireflection film provided with the anisotropic diffusion layer 16 was manufactured. As a result of measuring the anisotropic diffusivity (ADV) of the antireflection film, the measured anisotropic diffusivity (ADV) was 89.

Also, this antireflection film was bonded on the TAC film of the above-described liquid crystal display panel with the acrylic transparent adhesive film with a thickness of about 5 μm.

[Manufacturing of HC-1]

The composition of the coating solution HC-1 is shown in Table 4 below.

The coating solution HC-1 includes monomer and/or oligomer which are binder components. Moreover, the coating solution HC-1 includes a photoinitiator, an antifoamer, and a solvent. As the binder component UA-306T manufactured by KYOEISHA CHEMICAL Co., LTD was used. Moreover, as the binder component, viscoat #300 manufactured by OSAKA ORGANIC CHEMICAL INDUSTRY LTD and KAYARAD PET-30 manufactured by Nippon Kayaku Co., Ltd were used. In addition, as the photoinitiator, IRGACURE 184 manufactured by BASF Japan Ltd was used. As the antifoamer, NR-121X-9IPA manufactured by COLCOAT CO., LTD was used. Also, as the antifoamer, BYK-066N manufactured by ALTANA was used. These are solid content, and the compounding ratio thereof is as showing in Table 4.

And these solid content was thrown into a solvent so that it becomes about 50 mass %, and it was stirred. As the solvent, propylene glycol monomethyl ether and ethyl acetate were used.

TABLE 4

| Classification | Material name | HC-1 |
| --- | --- | --- |
| Binder component | US-306T | 72 |
|  | VISCOAT #300 | 10 |
|  | KAYARAD PET-30 | 10 |
| Photoinitiator | IRGACURE184 | 4.95 |
| Antifoamer | NR-121X-91PA | 3 |
|  | BYK-066N | 0.05 |
|  | Total | 100 |
| Solvent | Propylene glycol monomethyl ether | 60 |
|  | Ethyl acetate | 40 |
| Refractive index |  | 1.52 |

The unit is parts by mass.

[Manufacturing of LR-1]

The composition of the coating solution LR-1 is shown in Table 5 below.

The coating solution LR-1 includes monomer and/or oligomer and hollow silica particles 172 which are binder components. Moreover, the coating solution LR-1 includes a photoinitiator, an oil-repellent surface modifier 173, and a lipophilic surface modifier 173. In addition, the coating solution includes an antifoamer and a solvent. As the binder component, OPTOOL AR-100 manufactured by Daikin Industries, Ltd was used. In addition, as the binder component, KAYARAD PET-30 manufactured by Nippon Kayaku Co., Ltd was used. In addition, the hollow silica particles 172 having an average primary particle diameter of about 75 nm were used. In addition to the hollow silica particles 172, solid silica particles having an average primary particle diameter of about 10 nm were used. The solid silica particle is a silica particle having an inside which is not hollow but solid. In addition, as the photoinitiator, IRGACURE 184 manufactured by BASF Japan Ltd was used. Also, as the oil-repellent surface modifier 173, KY-1203 manufactured by Shin-Etsu Chemical Co., Ltd was used. In addition, as the lipophilic surface modifier 173, MEGAFAC RS-58 manufactured by DIC Corporation was used. In addition, as the lipophilic surface modifier 173, Futter Gento 650A manufactured by NEOS COMPANY LIMITED was used. Also, as the antifoamer, BYK-066N manufactured by ALTANA was used. These are solid content, and a mass compounding ratio thereof is as showing in Table 5.

And these solid content was thrown into the liquid mixture of MIBK and n-butyl alcohol which is a solvent, and they were stirred. At this time, the solid content was made to be about 5 mass %. In this way, the coating solution LR-1 for the low refractive index layer 17 was manufactured. In addition, the mass compounding ratio of the solvent is as showing in Table 5.

TABLE 5

| Classification | Material name | LR-1 |
|---|---|---|
| Binder component | AR-100 | 20 |
| | KAYARAD PET-30 | 10 |
| Hollow silica particles | average primary particle diameter 75 nm | 47.95 |
| Solid silica particles | average primary particle diameter 10 nm | 9 |
| Photoinitiator | IRGACURE184 | 2 |
| Surface modifier | KY-1203 | 5 |
| | MEGAFAC RS-58 | 5 |
| | Futter Gento 650A | 1 |
| Antifoamer | BYK-066N | 0.05 |
| | Total | 100 |
| Solvent | MIBK | 70 |
| | n-butyl alcohol | 30 |
| | Refractive index | 1.30 |

The unit is parts by mass.

Next, embodiments and comparative examples will be described.

EMBODIMENTS, COMPARATIVE EXAMPLES

Embodiments 1 to 18, Comparative Examples 1 to 15

Embodiments 1 to 18 and comparative examples 1 to 15 used any one of the structures 1 to 17 shown in Table 2 as the lens sheet, as illustrated in Tables 6 to 11. Moreover, the embodiments 1 to 18 and the comparative examples 1 to 15 used any one of the liquid crystal display device Panels 1 to 5 as illustrated in Tables 6 to 11.

TABLE 6

| | | EMBODIMENT 1 | EMBODIMENT 2 | EMBODIMENT 3 | EMBODIMENT 4 | EMBODIMENT 5 | EMBODIMENT 6 |
|---|---|---|---|---|---|---|---|
| COATING SOLUTION | LENS FILM | STRUCTURE 1 | STRUCTURE 2 | STRUCTURE 3 | STRUCTURE 4 | STRUCTURE 5 | STRUCTURE 6 |
| | LIQUID CRYSTAL DISPLAY DEVICE | PANEL 1 | PANEL 1 | PANEL 1 | PANEL 1 | PANEL 1 | PANEL 1 |
| EVALUATION RESULTS | FRONT LUMINANCE | A | A | A | A | A | A |
| | FRONT CONTRAST | A | A | A | A | A | A |
| | 30° LUMINANCE | A | A | A | A | A | A |
| | 60° LUMINANCE | A | A | A | A | A | B |
| | FWHM | A | A | A | A | A | B |
| | Δ u' v' | A | A | A | A | A | A |
| | WITH ANISOTROPIC DIFFUSION LAYER | ◯ | ◯ | ◯ | ◯ | ◯ | ◯ |
| | DIFFERENT LIGHT COLLECTING PROPERTY | ◯ | ◯ | ◯ | ◯ | ◯ | ◯ |

TABLE 7

| | | EMBODIMENT 7 | EMBODIMENT 8 | EMBODIMENT 9 | EMBODIMENT 10 | EMBODIMENT 11 | EMBODIMENT 12 |
|---|---|---|---|---|---|---|---|
| COATING SOLUTION | LENS FILM | STRUCTURE 7 | STRUCTURE 8 | STRUCTURE 9 | STRUCTURE 10 | STRUCTURE 1 | STRUCTURE 3 |
| | LIQUID CRYSTAL DISPLAY DEVICE | PANEL 1 | PANEL 1 | PANEL 1 | PANEL 1 | PANEL 2 | PANEL 2 |
| EVALUATION RESULTS | FRONT LUMINANCE | B | B | A | A | A | A |
| | FRONT CONTRAST | B | B | A | A | A | A |
| | 30° LUMINANCE | B | B | B | B | A | A |
| | 60° LUMINANCE | A | A | B | B | A | A |
| | FWHM | A | A | B | B | A | A |
| | Δ u' v' | A | A | A | A | B | B |
| | WITH ANISOTROPIC DIFFUSION LAYER | ◯ | ◯ | ◯ | ◯ | ◯ | ◯ |

TABLE 7-continued

|  | EMBODIMENT 7 | EMBODIMENT 8 | EMBODIMENT 9 | EMBODIMENT 10 | EMBODIMENT 11 | EMBODIMENT 12 |
|---|---|---|---|---|---|---|
| DIFFERENT LIGHT COLLECTING PROPERTY | ◯ | ◯ | ◯ | ◯ | ◯ | ◯ |

TABLE 8

| | | EMBODIMENT 13 | EMBODIMENT 14 | EMBODIMENT 15 | EMBODIMENT 16 | EMBODIMENT 17 | EMBODIMENT 18 |
|---|---|---|---|---|---|---|---|
| COATING SOLUTION | LENS FILM | STRUCTURE 5 | STRUCTURE 9 | STRUCTURE 2 | STRUCTURE 4 | STRUCTURE 5 | STRUCTURE 10 |
| | LIQUID CRYSTAL DISPLAY DEVICE | PANEL 2 | PANEL 2 | PANEL 3 | PANEL 3 | PANEL 3 | PANEL 3 |
| EVALUATION RESULTS | FRONT LUMINANCE | A | A | A | A | A | A |
| | FRONT CONTRAST | A | B | A | A | A | A |
| | 30° LUMINANCE | A | B | A | A | A | B |
| | 60° LUMINANCE | B | B | A | A | A | B |
| | FWHM | A | B | A | A | A | B |
| | Δ u' v' | B | B | A | A | A | A |
| | WITH ANISOTROPIC DIFFUSION LAYER | ◯ | ◯ | ◯ | ◯ | ◯ | ◯ |
| | DIFFERENT LIGHT COLLECTING PROPERTY | ◯ | ◯ | ◯ | ◯ | ◯ | ◯ |

TABLE 9

| | | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | COMPARATIVE EXAMPLE 6 |
|---|---|---|---|---|---|---|---|
| COATING SOLUTION | LENS FILM | STRUCTURE 11 | STRUCTURE 12 | STRUCTURE 13 | STRUCTURE 14 | STRUCTURE 15 | STRUCTURE 16 |
| | LIQUID CRYSTAL DISPLAY DEVICE | PANEL 4 | PANEL 4 | PANEL 4 | PANEL 4 | PANEL 4 | PANEL 4 |
| EVALUATION RESULTS | FRONT LUMINANCE | A | A | B | A | A | A |
| | FRONT CONTRAST | A | A | A | A | A | A |
| | 30° LUMINANCE | D | D | D | D | D | D |
| | 60° LUMINANCE | D | D | D | D | D | D |
| | FWHM | D | D | D | D | D | D |
| | Δ u' v' | D | D | D | D | D | D |
| | WITH ANISOTROPIC DIFFUSION LAYER | X | X | X | X | X | X |
| | DIFFERENT LIGHT COLLECTING PROPERTY | X | X | X | X | X | X |

TABLE 10

| | | COMPARATIVE EXAMPLE 7 | COMPARATIVE EXAMPLE 8 | COMPARATIVE EXAMPLE 9 | COMPARATIVE EXAMPLE 10 | COMPARATIVE EXAMPLE 11 | COMPARATIVE EXAMPLE 12 |
|---|---|---|---|---|---|---|---|
| COATING SOLUTION | LENS FILM | STRUCTURE 1 | STRUCTURE 5 | STRUCTURE 11 | STRUCTURE 12 | STRUCTURE 13 | STRUCTURE 11 |
| | LIQUID CRYSTAL DISPLAY DEVICE | PANEL 4 | PANEL 4 | PANEL 1 | PANEL 1 | PANEL 1 | PANEL 5 |
| EVALUATION RESULTS | FRONT LUMINANCE | A | A | A | B | B | C |
| | FRONT CONTRAST | A | A | A | A | A | D |

TABLE 10-continued

|  | COMPARATIVE EXAMPLE 7 | COMPARATIVE EXAMPLE 8 | COMPARATIVE EXAMPLE 9 | COMPARATIVE EXAMPLE 10 | COMPARATIVE EXAMPLE 11 | COMPARATIVE EXAMPLE 12 |
|---|---|---|---|---|---|---|
| 30° LUMINANCE | C | D | D | D | D | C |
| 60° LUMINANCE | D | D | B | B | B | A |
| FWHM | B | C | D | D | D | C |
| Δ u' v' | D | D | A | A | A | A |
| WITH ANISOTROPIC DIFFUSION LAYER | X | X | ○ | ○ | ○ | ○ |
| DIFFERENT LIGHT COLLECTING PROPERTY | ○ | ○ | X | X | X | X |

TABLE 11

|  |  | COMPARATIVE EXAMPLE 13 | COMPARATIVE EXAMPLE 14 | COMPARATIVE EXAMPLE 15 |
|---|---|---|---|---|
| COATING SOLUTION | LENS FILM | STRUCTURE 12 | STRUCTURE 13 | STRUCTURE 17 |
|  | LIQUID CRYSTAL DISPLAY DEVICE | PANEL 5 | PANEL 5 | PANEL 4 |
| EVALUATION RESULTS | FRONT LUMINANCE | D | D | D |
|  | FRONT CONTRAST | D | D | B |
|  | 30° LUMINANCE | C | C | B |
|  | 60° LUMINANCE | A | A | C |
|  | FWHM | C | C | B |
|  | Δ u' v' | A | A | D |
| WITH ANISOTROPIC DIFFUSION LAYER |  | ○ | ○ | X |
| DIFFERENT LIGHT COLLECTING PROPERTY |  | X | X | — |

Then, measurements were made for front luminance, front contrast (front CR), 30° luminance, 60° luminance, FWHM, and Δu'v' (color change). The measurement method is the same as the case described in FIG. 12.

At this time, the evaluation was evaluated in 4 grades of A to D as follows.

(Front Luminance)
900 cd/cm² or more A
800 cd/cm² or more and less than 900 cd/cm² B
700 cd/cm² or more and less than 800 cd/cm² C
Less than 700 cd/cm²
(Front Contrast (Front CR))
3500 or more A
2800 or more and less than 3500 B
2000 or more and less than 2800 C
Less than 2000 D
(30° Luminance)
70% or more A
65% or more and less than 70% B
55% or more and less than 65% C
Less than 55% D
(60° Luminance)
30% or more A
25% or more and less than 30% B
20% or more and less than 25% C
Less than 20% D
(FWHM)
84% or more A
78% or more and less than 84% B
70% or more and less than 78% C
Less than 70% D
(Δu'v' (Color Change))
Less than 0.012% A
0.012% or more and less than 0.015% B
0.015% or more and less than 0.020% C
0.020% or more D

[Evaluation Result]

The evaluation results are shown in Tables 6 to 11.

Embodiments 1 to 18 are cases in which the anisotropic diffusion layer 16 is provided. Also, they are cases in which the first lens sheet 114 and the second lens sheet 115 are used. In addition, they are cases where the light collecting property of the second lens sheet 115 is higher than that of the first lens sheet 114. This may be said to be a case where the light collecting property in the up-down direction of the liquid crystal display device 1a is higher than that in the left-right direction.

In Tables 6 to 11, the case in which the anisotropic diffusion layer 16 or the first lens sheet 114 and the second lens sheet 115 are provided is indicated by '0'. The case in which the anisotropic diffusion layer 16 or the first lens sheet 114 and the second lens sheet 115 are not provided is indicated by 'X'. In addition, the case where the light collecting property in the up-down direction is higher than the light collecting property in the left-right direction is indicated by '0'. The case where the light collecting property in the up-down direction and the light collecting property in the left-right direction are the same is indicated by 'X'.

In this case, all of the front luminance, front contrast (front CR), 30° luminance, 60° luminance, FWHM, and Δu'v' (color change) were A or B. That is, all evaluation items were substantially good.

Comparative examples 1 to 6 are cases in which the anisotropic diffusion layer 16 is not provided. Also, they are cases where the first lens sheet 114 and the second lens sheet 115 are provided. However, the same lens sheet is used for the first lens sheet 114 and the second lens sheet 115. In other words, the light collecting properties of the first lens sheet 114 and the second lens sheet 115 are the same. This may be said to be the case where the light collecting properties of the liquid crystal display device 1a in the left-right direction and the up-down direction are the same.

In this case, the front luminance and the front contrast (front CR) are good. The 30° luminance, the 60° luminance, FWHM, and Δu'v' (color change) were all D and were defective.

Comparative examples 7 and 8 are cases in which the anisotropic diffusion layer 16 is not provided. Also, they are cases where the first lens sheet 114 and the second lens sheet 115 are provided. In addition, they are cases where the light collecting property of the second lens sheet 115 is higher than that of the first lens sheet 114.

In this case, the front luminance and the front contrast (front CR) are good. The 30° luminance, the 60° luminance, FWHM, and Δu'v' (color change) were almost C or D and were defective.

Comparative examples 9 to 14 are cases in which the anisotropic diffusion layer 16 is provided. Also, they are cases where the first lens sheet 114 and the second lens sheet 115 are provided. However, they are the cases where the same lens sheet is used for the first lens sheet 114 and the second lens sheet 115. In other words, the light collecting properties of the first lens sheet 114 and the second lens sheet 115 are the same.

In this case, Δu'v' (color change) is good. They had at least one D in the front luminance, the front contrast (front CR), the 30° luminance, and FWHM, and were defective.

In comparative example 15, both the anisotropic diffusion layer 16 and the lens sheets are not provided. In this case, the front luminance and the Δu'v' (color change) are D, and it is defective.

According to the above description, by providing the anisotropic diffusion layer 16, the viewing angle characteristic is improved in part. That is, in the region of about 40° or more and about 70° or less and about −70° or more and about −40° or less with respect to the front direction, the luminance becomes high. Moreover, by providing the anisotropic diffusion layer 16, Δu'v' (color change) becomes substantially small.

And by providing the first lens sheet 114 and the second lens sheet 115, the viewing angle characteristic which was difficult to be improved by the anisotropic diffusion layer 16 is improved. That is, in the region of about 20° or more and about 40° or less and about −40° or more and about −20° or less with respect to the front direction, the luminance becomes high. In other words, the region that was difficult to be improved by the anisotropic diffusion layer 16 is supplemented by the first lens sheet 114 and the second lens sheet 115. Specifically, the first lens sheet 114 and the second lens sheet 115 are provided, and the light collecting property of the second lens sheet 115 is made higher than that of the first lens sheet 114. Moreover, this effect may be a remarkable effect beyond the mere combination of these matters.

As a result, in this embodiment, the viewing angle characteristic in not only the front direction but the viewing angle characteristic in diagonal directions other than the front direction is further improved than that of the prior art. In this embodiment, it may be said that the viewing angle characteristic of the front direction and the viewing angle characteristic of diagonal directions other than the front direction are made compatible. Further, in this embodiment, the front luminance and the contrast in the front direction (front contrast) are also good, and the image quality characteristic in the front direction is also good. In addition, the display apparatus 1 provided with the liquid crystal display device 1a according to this embodiment may have better image quality than that of the prior art.

Moreover, when this embodiment is applied to the liquid crystal display device using the VA type liquid crystal display panel, it is especially effective. In addition, when applied to the backlight device 11 using the color conversion sheet 113, it is especially effective. Moreover, when the anisotropic diffusion layer 16 are provided with the resin part 161 and the anisotropic particles 162, this complementary effect is remarkable and is especially effective.

Moreover, in the above-described embodiments, the light collecting property in the up-down direction was made higher than the light collecting property in the left-right direction. However, conversely, it is also possible to make the light collecting property in the left-right direction higher than the light collecting property in the up-down direction.

In addition, the display apparatus 1 may have a pivot (screen rotation) function. By the pivot function, the screen of the display apparatus 1 may be rotated by 90 degrees. In this case, the display apparatus 1 is disposed so that the long side direction of the liquid crystal display device 1a becomes the left-right direction and the short side direction thereof becomes the up-down direction, for example. Also, the light collecting property in the up-down direction is made higher than the light collecting property in the left-right direction. Then, when the display apparatus 1 is rotated, the left-right direction and the up-down direction are reversed. As a result, the light collecting property in the left-right direction becomes higher than the light collecting property in the up-down direction. In other words, except for the case where the light collecting property in the up-down direction is higher than the light collecting property in the left-right direction, the relationship between these may be reversed depending on the mode of use of the display apparatus 1.

The invention claimed is:
1. A liquid crystal display device comprising:
a light source which emits light;
a light collection part which collects the light emitted from the light source in a front direction of the liquid crystal display device so that, when an image is displayed, light collecting property in a left-right direction is different from the light collecting property in an up-down direction, the light collection part including:
two lens sheets in which a plurality of lenses is arranged in a planar shape, the two lens sheets including:
a first lens sheet; and
a second lens sheet having a higher light collecting property than a light collecting property of the first lens sheet;
at least one of a first adhesive layer disposed on a light-emitting side with respect to the first lens sheet and a second adhesive layer disposed on the light-emitting side with a respect to the second lens sheet;
a liquid crystal part which controls a transmission state of the light collected by the light collection part using a liquid crystal; and
an anisotropic diffusion layer which anisotropically diffuses the light passing through the liquid crystal part,
wherein when the first adhesive layer is provided, the light collecting property of the first lens sheet is controlled by the first adhesive layer, and when the second adhe- sive layer is provided, the light collecting property of the second lens sheet is controlled by the second adhesive layer.

2. The liquid crystal display device of claim 1, wherein the light collection part has a low light collecting property in a direction in which a viewing angle is to be enlarged among the left-right direction and the up-down direction.

3. The liquid crystal display device of claim 2, wherein by a difference in the light collecting properties between the first lens sheet and the second lens sheet, the light collecting property in the direction in which the viewing angle is to be enlarged among the left-right direction and the up-down direction is lowered.

4. The liquid crystal display device of claim 1, wherein the first lens sheet and the second lens sheet are an equal type of lens sheet, and
wherein when the first adhesive layer is provided, the light collecting property of the first lens sheet is controlled according to a thickness of the first adhesive layer, and when the second adhesive layer is provided, the light collecting property of the second lens sheet is controlled according to a thickness of the second adhesive layer.

5. The liquid crystal display device of claim 2, wherein a full width half maximum of a luminance distribution, which is a relationship between luminance and an angle with respect to the front direction, is an index indicating the light collecting property by the light collection part and is greater by about 7° or more with respect to the direction in which the viewing angle is to be enlarged among the left-right direction and the up-down direction.

6. The liquid crystal display device of claim 1, wherein the anisotropic diffusion layer includes anisotropic particles having an anisotropic shape, a long axis direction of each of which is arranged along one direction, and a resin part dispersing the anisotropic particles and being including a resin.

7. The liquid crystal display device of claim 6, wherein a refractive index in the long axis direction and a refractive index in a short axis direction of each of the anisotropic particles are different.

8. The liquid crystal display device of claim 6, wherein a refractive index of the resin part is about 1.45 or more and about 1.65 or less.

9. The liquid crystal display device of claim 6, further comprising:
a low refractive index layer having a refractive index of about 1.40 or less,
wherein a difference between a refractive index of the resin part and the refractive index of the low refractive index layer is about 0.1 or more.

10. The liquid crystal display device of claim 6, further comprising:
a high refractive index layer having a refractive index of about 1.60 or more.

11. The liquid crystal display device of claim 6, further comprising:
a hard coating layer having a refractive index of about 1.54 or more.

12. The liquid crystal display device of claim 6, further comprising:
a low refractive index layer having a refractive index of about 1.40 or less; and
a substrate which supports the anisotropic diffusion layer, wherein the substrate is provided between the low refractive index layer and the anisotropic diffusion layer.

13. The liquid crystal display device of claim 6, further comprising:
a low refractive index layer having a refractive index of about 1.40 or less,
wherein the anisotropic diffusion layer functions as substrate supporting the low refractive index layer.

14. A display apparatus comprising the liquid crystal display device according to claim 1.

15. A liquid crystal display device comprising:
a light source which emits light;
a light collection part which collects the light emitted from the light source in a front direction of the liquid crystal display device so that, when an image is displayed, light collecting property in a first direction is different from the light collecting property in a second direction perpendicular to the first direction, the light collection part including:
the two lens sheets in which a plurality of lenses is arranged in a planar shape, the two lens sheets including:
a first lens sheet; and
a second lens sheet having a higher light collecting property than a light collecting property of the first lens sheet;
at least one of a first adhesive layer disposed on a light-emitting side with respect to the first lens sheet and a second adhesive layer disposed on the light-emitting side with respect to the second lens sheet;
a liquid crystal part which controls a transmission state of the light collected by the light collection part; and
an anisotropic diffusion layer which anisotropically diffuses the light passing through the liquid crystal part,
wherein when the first adhesive layer is provided, the light collecting property of the first lens sheet is controlled by the first adhesive layer, and when the second adhesive layer is provided, the light collecting property of the second lens sheet is controlled by the second adhesive layer.

16. The liquid crystal display device of claim 15, wherein the light collection part has a low light collecting property in a direction in which a viewing angle is to be enlarged among the first direction and the second direction.

17. The liquid crystal display device of claim 16, wherein by a difference in the light collecting properties between the first lens sheet and the second lens sheet, the light collecting property in the direction in which the viewing angle is to be enlarged among the first direction and the second direction is lowered.

18. The liquid crystal display device of claim 15, wherein a full width half maximum of a luminance distribution, which is a relationship between luminance and an angle with respect to the front direction, is an index indicating the light collecting property by the light collection part and is greater by about 7° or more with respect to the direction in which a viewing angle is to be enlarged among the first direction and the second direction.

* * * * *